(12) United States Patent
Sommer et al.

(10) Patent No.: US 8,261,159 B1
(45) Date of Patent: Sep. 4, 2012

(54) DATA SCRAMBLING SCHEMES FOR MEMORY DEVICES

(75) Inventors: Naftali Sommer, Rishon Lezion (IL); Micha Anholt, Tel Aviv (IL); Oren Golov, Hod Hasharon (IL); Uri Perlmutter, Ra'anana (IL); Shai Winter, Giva'ataim (IL); Gil Semo, Tel Aviv (IL)

(73) Assignee: Apple, Inc., Cupertino, CA (US)

( * ) Notice: Subject to any disclaimer, the term of this patent is extended or adjusted under 35 U.S.C. 154(b) by 440 days.

(21) Appl. No.: 12/607,085

(22) Filed: Oct. 28, 2009

Related U.S. Application Data

(60) Provisional application No. 61/109,767, filed on Oct. 30, 2008, provisional application No. 61/115,085, filed on Nov. 16, 2008.

(51) Int. Cl.
*G06F 11/00* (2006.01)
(52) U.S. Cl. .................................... 714/768; 713/193
(58) Field of Classification Search .............. 714/768, 714/773; 713/193
See application file for complete search history.

(56) References Cited

U.S. PATENT DOCUMENTS

| | | | |
|---|---|---|---|
| 3,668,631 A | 6/1972 | Griffith et al. |
| 3,668,632 A | 6/1972 | Oldham |
| 4,058,851 A | 11/1977 | Scheuneman |
| 4,112,502 A | 9/1978 | Scheuneman |
| 4,394,763 A | 7/1983 | Nagano et al. |
| 4,413,339 A | 11/1983 | Riggle et al. |
| 4,556,961 A | 12/1985 | Iwahashi et al. |
| 4,558,431 A | 12/1985 | Satoh |
| 4,608,687 A | 8/1986 | Dutton |
| 4,654,847 A | 3/1987 | Dutton |
| 4,661,929 A | 4/1987 | Aoki et al. |
| 4,768,171 A | 8/1988 | Tada |
| 4,811,285 A | 3/1989 | Walker et al. |
| 4,899,342 A | 2/1990 | Potter et al. |
| 4,910,706 A | 3/1990 | Hyatt |
| 4,993,029 A | 2/1991 | Galbraith et al. |
| 5,056,089 A | 10/1991 | Mehrotta et al. |
| 5,077,722 A | 12/1991 | Geist et al. |
| 5,126,808 A | 6/1992 | Montalvo et al. |
| 5,163,021 A | 11/1992 | Mehrotra et al. |
| 5,172,338 A | 12/1992 | Mehrotra et al. |
| 5,182,558 A | 1/1993 | Mayo |
| 5,182,752 A | 1/1993 | DeRoo et al. |
| 5,191,584 A | 3/1993 | Anderson |
| 5,200,959 A | 4/1993 | Gross et al. |

(Continued)

FOREIGN PATENT DOCUMENTS

EP 0783754 B1 7/1997

(Continued)

OTHER PUBLICATIONS

U.S. Appl. No. 12/323,544 Office Action dated Dec. 13, 2011.

(Continued)

*Primary Examiner* — Marc Duncan
(74) *Attorney, Agent, or Firm* — Meyertons, Hood, Kivlin, Kowert & Goetzel, P.C.

(57) ABSTRACT

A method for data storage includes defining a set of scrambling sequences, each sequence including bits in respective bit positions having bit values, such that a distribution of the bit values in any give bit position satisfies a predefined statistical criterion. Each data word is scrambled using a respective scrambling sequence selected from the set. The scrambled data words are stored in the memory device.

12 Claims, 3 Drawing Sheets

U.S. PATENT DOCUMENTS

| | | | |
|---|---|---|---|
| 5,237,535 A | 8/1993 | Mielke et al. |
| 5,272,669 A | 12/1993 | Samachisa et al. |
| 5,276,649 A | 1/1994 | Hoshita et al. |
| 5,287,469 A | 2/1994 | Tsuboi |
| 5,365,484 A | 11/1994 | Cleveland et al. |
| 5,388,064 A | 2/1995 | Khan |
| 5,416,646 A | 5/1995 | Well et al. |
| 5,416,782 A | 5/1995 | Wells et al. |
| 5,446,854 A | 8/1995 | Khalidi et al. |
| 5,450,424 A | 9/1995 | Okugaki et al. |
| 5,469,444 A | 11/1995 | Endoh et al. |
| 5,473,753 A | 12/1995 | Wells et al. |
| 5,479,170 A | 12/1995 | Cauwenberghs et al. |
| 5,508,958 A | 4/1996 | Fazio et al. |
| 5,519,831 A | 5/1996 | Holzhammer |
| 5,532,962 A | 7/1996 | Auclair et al. |
| 5,533,190 A | 7/1996 | Binford et al. |
| 5,541,886 A | 7/1996 | Hasbun |
| 5,600,677 A | 2/1997 | Citta et al. |
| 5,638,320 A | 6/1997 | Wong et al. |
| 5,657,332 A | 8/1997 | Auclair et al. |
| 5,675,540 A | 10/1997 | Roohparvar |
| 5,682,352 A | 10/1997 | Wong et al. |
| 5,687,114 A | 11/1997 | Khan |
| 5,696,717 A | 12/1997 | Koh |
| 5,726,649 A | 3/1998 | Tamaru et al. |
| 5,726,934 A | 3/1998 | Tran et al. |
| 5,742,752 A | 4/1998 | De Koening |
| 5,748,533 A | 5/1998 | Dunlap et al. |
| 5,748,534 A | 5/1998 | Dunlap et al. |
| 5,751,637 A | 5/1998 | Chen et al. |
| 5,761,402 A | 6/1998 | Kaneda et al. |
| 5,798,966 A | 8/1998 | Keeney |
| 5,799,200 A | 8/1998 | Brant et al. |
| 5,801,985 A | 9/1998 | Roohparvar et al. |
| 5,838,832 A | 11/1998 | Barnsley |
| 5,860,106 A | 1/1999 | Domen et al. |
| 5,867,114 A | 2/1999 | Barbir |
| 5,867,428 A | 2/1999 | Ishii et al. |
| 5,867,429 A | 2/1999 | Chen et al. |
| 5,877,986 A | 3/1999 | Harari et al. |
| 5,889,937 A | 3/1999 | Tamagawa |
| 5,901,089 A | 5/1999 | Korsh et al. |
| 5,909,449 A | 6/1999 | So et al. |
| 5,912,906 A | 6/1999 | Wu et al. |
| 5,930,167 A | 7/1999 | Lee et al. |
| 5,937,424 A | 8/1999 | Leak et al. |
| 5,942,004 A | 8/1999 | Cappelletti |
| 5,946,716 A | 8/1999 | Karp et al. |
| 5,969,986 A | 10/1999 | Wong et al. |
| 5,982,668 A | 11/1999 | Ishii et al. |
| 5,991,517 A | 11/1999 | Harari et al. |
| 5,995,417 A | 11/1999 | Chen et al. |
| 6,009,014 A | 12/1999 | Hollmer et al. |
| 6,009,016 A | 12/1999 | Ishii et al. |
| 6,023,425 A | 2/2000 | Ishii et al. |
| 6,034,891 A | 3/2000 | Norman |
| 6,040,993 A | 3/2000 | Chen et al. |
| 6,041,430 A | 3/2000 | Yamauchi |
| 6,073,204 A | 6/2000 | Lakhani et al. |
| 6,101,614 A | 8/2000 | Gonzales et al. |
| 6,128,237 A | 10/2000 | Shirley et al. |
| 6,134,140 A | 10/2000 | Tanaka et al. |
| 6,134,143 A | 10/2000 | Norman |
| 6,134,631 A | 10/2000 | Jennings |
| 6,141,261 A | 10/2000 | Patti |
| 6,151,246 A | 11/2000 | So et al. |
| 6,157,573 A | 12/2000 | Ishii et al. |
| 6,166,962 A | 12/2000 | Chen et al. |
| 6,169,691 B1 | 1/2001 | Pasotti et al. |
| 6,178,466 B1 | 1/2001 | Gilbertson et al. |
| 6,185,134 B1 | 2/2001 | Tanaka et al. |
| 6,209,113 B1 | 3/2001 | Roohparvar |
| 6,212,654 B1 | 4/2001 | Lou et al. |
| 6,219,276 B1 | 4/2001 | Parker |
| 6,219,447 B1 | 4/2001 | Lee et al. |
| 6,222,762 B1 | 4/2001 | Guterman et al. |
| 6,230,233 B1 | 5/2001 | Lofgren et al. |
| 6,240,458 B1 | 5/2001 | Gilbertson |
| 6,259,627 B1 | 7/2001 | Wong |
| 6,275,419 B1 | 8/2001 | Guterman et al. |
| 6,278,632 B1 | 8/2001 | Chevallier |
| 6,279,069 B1 | 8/2001 | Robinson et al. |
| 6,288,944 B1 | 9/2001 | Kawamura |
| 6,292,394 B1 | 9/2001 | Cohen et al. |
| 6,301,151 B1 | 10/2001 | Engh et al. |
| 6,304,486 B1 | 10/2001 | Yano |
| 6,307,776 B1 | 10/2001 | So et al. |
| 6,314,044 B1 | 11/2001 | Sasaki et al. |
| 6,317,363 B1 | 11/2001 | Guterman et al. |
| 6,317,364 B1 | 11/2001 | Guterman et al. |
| 6,345,004 B1 | 2/2002 | Omura et al. |
| 6,360,346 B1 | 3/2002 | Miyauchi et al. |
| 6,363,008 B1 | 3/2002 | Wong |
| 6,363,454 B1 | 3/2002 | Lakhani et al. |
| 6,366,496 B1 | 4/2002 | Torelli et al. |
| 6,385,092 B1 | 5/2002 | Ishii et al. |
| 6,392,932 B1 | 5/2002 | Ishii et al. |
| 6,396,742 B1 | 5/2002 | Korsh et al. |
| 6,397,364 B1 | 5/2002 | Barkan |
| 6,405,323 B1 | 6/2002 | Lin et al. |
| 6,405,342 B1 | 6/2002 | Lee |
| 6,418,060 B1 | 7/2002 | Yong et al. |
| 6,442,585 B1 | 8/2002 | Dean et al. |
| 6,445,602 B1 | 9/2002 | Kokudo et al. |
| 6,452,838 B1 | 9/2002 | Ishii et al. |
| 6,456,528 B1 | 9/2002 | Chen |
| 6,466,476 B1 | 10/2002 | Wong et al. |
| 6,467,062 B1 | 10/2002 | Barkan |
| 6,469,931 B1 | 10/2002 | Ban et al. |
| 6,480,948 B1 | 11/2002 | Virajpet et al. |
| 6,490,236 B1 | 12/2002 | Fukuda et al. |
| 6,522,580 B2 | 2/2003 | Chen et al. |
| 6,525,952 B2 | 2/2003 | Araki et al. |
| 6,532,556 B1 | 3/2003 | Wong et al. |
| 6,538,922 B1 | 3/2003 | Khalid et al. |
| 6,558,967 B1 | 3/2003 | Wong |
| 6,549,464 B2 | 4/2003 | Tanaka et al. |
| 6,553,510 B1 | 4/2003 | Pekny |
| 6,560,152 B1 | 5/2003 | Cernea |
| 6,567,311 B2 | 5/2003 | Ishii et al. |
| 6,577,539 B2 | 6/2003 | Iwahashi |
| 6,584,012 B2 | 6/2003 | Banks |
| 6,615,307 B1 | 9/2003 | Roohparvar |
| 6,621,739 B2 | 9/2003 | Gonzales et al. |
| 6,640,326 B1 | 10/2003 | Buckingham et al. |
| 6,643,169 B2 | 11/2003 | Rudelic et al. |
| 6,646,913 B2 | 11/2003 | Micheloni et al. |
| 6,678,192 B2 | 1/2004 | Gongwer et al. |
| 6,683,811 B2 | 1/2004 | Ishii et al. |
| 6,687,155 B2 | 2/2004 | Nagasue |
| 6,707,748 B2 | 3/2004 | Lin et al. |
| 6,708,257 B2 | 3/2004 | Bao |
| 6,714,449 B2 | 3/2004 | Khalid |
| 6,717,847 B2 | 4/2004 | Chen |
| 6,731,557 B2 | 5/2004 | Beretta |
| 6,732,250 B2 | 5/2004 | Durrant |
| 6,738,293 B1 | 5/2004 | Iwahashi |
| 6,751,766 B2 | 6/2004 | Guterman et al. |
| 6,757,193 B2 | 6/2004 | Chen et al. |
| 6,774,808 B1 | 8/2004 | Hibbs et al. |
| 6,781,877 B2 | 8/2004 | Cernea et al. |
| 6,804,805 B2 | 10/2004 | Rub |
| 6,807,095 B2 | 10/2004 | Chen et al. |
| 6,807,101 B2 | 10/2004 | Ooishi et al. |
| 6,809,964 B2 | 10/2004 | Moschopoulos et al. |
| 6,819,592 B2 | 11/2004 | Noguchi et al. |
| 6,829,167 B2 | 12/2004 | Tu et al. |
| 6,845,052 B1 | 1/2005 | Ho et al. |
| 6,851,018 B2 | 2/2005 | Wyatt et al. |
| 6,851,081 B2 | 2/2005 | Yamamoto |
| 6,856,546 B2 | 2/2005 | Guterman et al. |
| 6,862,218 B2 | 3/2005 | Guterman et al. |
| 6,870,767 B2 | 3/2005 | Rudelic et al. |
| 6,870,773 B2 | 3/2005 | Noguchi et al. |
| 6,873,552 B2 | 3/2005 | Ishii et al. |
| 6,879,520 B2 | 4/2005 | Hosono et al. |

| Patent | Date | Name |
|---|---|---|
| 6,882,567 B1 | 4/2005 | Wong |
| 6,894,926 B2 | 5/2005 | Guterman et al. |
| 6,907,497 B2 | 6/2005 | Hosono et al. |
| 6,925,009 B2 | 8/2005 | Noguchi et al. |
| 6,930,925 B2 | 8/2005 | Guo et al. |
| 6,934,188 B2 | 8/2005 | Roohparvar |
| 6,937,511 B2 | 8/2005 | Hsu et al. |
| 6,958,938 B2 | 10/2005 | Noguchi et al. |
| 6,963,505 B2 | 11/2005 | Cohen |
| 6,972,993 B2 | 12/2005 | Conley et al. |
| 6,988,175 B2 | 1/2006 | Lasser |
| 6,992,932 B2 | 1/2006 | Cohen |
| 6,999,344 B2 | 2/2006 | Hosono et al. |
| 7,002,843 B2 | 2/2006 | Guterman et al. |
| 7,006,379 B2 | 2/2006 | Noguchi et al. |
| 7,012,835 B2 | 3/2006 | Gonzales et al. |
| 7,020,017 B2 | 3/2006 | Chen et al. |
| 7,023,735 B2 | 4/2006 | Ban et al. |
| 7,031,210 B2 | 4/2006 | Park et al. |
| 7,031,214 B2 | 4/2006 | Tran |
| 7,031,216 B2 | 4/2006 | You |
| 7,039,846 B2 | 5/2006 | Hewitt et al. |
| 7,042,766 B1 | 5/2006 | Wang et al. |
| 7,054,193 B1 | 5/2006 | Wong |
| 7,054,199 B2 | 5/2006 | Lee et al. |
| 7,057,958 B2 | 6/2006 | So et al. |
| 7,065,147 B2 | 6/2006 | Ophir et al. |
| 7,068,539 B2 | 6/2006 | Guterman et al. |
| 7,071,849 B2 | 7/2006 | Zhang |
| 7,072,222 B2 | 7/2006 | Ishii et al. |
| 7,079,555 B2 | 7/2006 | Baydar et al. |
| 7,088,615 B2 | 8/2006 | Guterman et al. |
| 7,099,194 B2 | 8/2006 | Tu et al. |
| 7,102,924 B2 | 9/2006 | Chen et al. |
| 7,113,432 B2 | 9/2006 | Mokhlesi |
| 7,130,210 B2 | 10/2006 | Bathul et al. |
| 7,139,192 B1 | 11/2006 | Wong |
| 7,139,198 B2 | 11/2006 | Guterman et al. |
| 7,145,805 B2 | 12/2006 | Ishii et al. |
| 7,151,692 B2 | 12/2006 | Wu |
| 7,158,058 B1 * | 1/2007 | Yu ................................... 341/58 |
| 7,170,781 B2 | 1/2007 | So et al. |
| 7,170,802 B2 | 1/2007 | Cernea et al. |
| 7,173,859 B2 | 2/2007 | Hemink |
| 7,177,184 B2 | 2/2007 | Chen |
| 7,177,195 B2 | 2/2007 | Gonzales et al. |
| 7,177,199 B2 | 2/2007 | Chen et al. |
| 7,177,200 B2 | 2/2007 | Ronen et al. |
| 7,184,338 B2 | 2/2007 | Nakagawa et al. |
| 7,187,195 B2 | 3/2007 | Kim |
| 7,187,592 B2 | 3/2007 | Guterman et al. |
| 7,190,614 B2 | 3/2007 | Wu |
| 7,193,898 B2 | 3/2007 | Cernea |
| 7,193,921 B2 | 3/2007 | Choi et al. |
| 7,196,644 B1 | 3/2007 | Anderson et al. |
| 7,196,928 B2 | 3/2007 | Chen |
| 7,196,933 B2 | 3/2007 | Shibata |
| 7,197,594 B2 | 3/2007 | Raz et al. |
| 7,200,062 B2 | 4/2007 | Kinsely et al. |
| 7,210,077 B2 | 4/2007 | Brandenberger et al. |
| 7,221,592 B2 | 5/2007 | Nazarian |
| 7,224,613 B2 | 5/2007 | Chen et al. |
| 7,231,474 B1 | 6/2007 | Helms et al. |
| 7,231,562 B2 | 6/2007 | Ohlhoff et al. |
| 7,243,275 B2 | 7/2007 | Gongwer et al. |
| 7,254,690 B2 | 8/2007 | Rao |
| 7,254,763 B2 | 8/2007 | Aadsen et al. |
| 7,257,027 B2 | 8/2007 | Park |
| 7,259,987 B2 | 8/2007 | Chen et al. |
| 7,266,026 B2 | 9/2007 | Gongwer et al. |
| 7,266,069 B2 | 9/2007 | Chu |
| 7,269,066 B2 | 9/2007 | Nguyen et al. |
| 7,272,757 B2 | 9/2007 | Stocken |
| 7,274,611 B2 | 9/2007 | Roohparvar |
| 7,277,355 B2 | 10/2007 | Tanzana |
| 7,280,398 B1 | 10/2007 | Lee et al. |
| 7,280,409 B2 | 10/2007 | Misumi et al. |
| 7,280,415 B2 | 10/2007 | Hwang et al. |
| 7,283,399 B2 | 10/2007 | Ishii et al. |
| 7,289,344 B2 | 10/2007 | Chen |
| 7,301,807 B2 | 11/2007 | Khalid et al. |
| 7,301,817 B2 | 11/2007 | Li et al. |
| 7,308,525 B2 | 12/2007 | Lasser et al. |
| 7,310,255 B2 | 12/2007 | Chan |
| 7,310,269 B2 | 12/2007 | Shibata |
| 7,310,271 B2 | 12/2007 | Lee |
| 7,310,272 B1 | 12/2007 | Mokhlesi et al. |
| 7,310,347 B2 | 12/2007 | Lasser |
| 7,312,727 B1 * | 12/2007 | Feng et al. ................... 341/58 |
| 7,321,509 B2 | 1/2008 | Chen et al. |
| 7,328,384 B1 | 2/2008 | Kulkarni et al. |
| 7,342,831 B2 | 3/2008 | Mokhlesi et al. |
| 7,343,330 B1 | 3/2008 | Boesjes et al. |
| 7,345,924 B2 | 3/2008 | Nguyen et al. |
| 7,345,928 B2 | 3/2008 | Li |
| 7,349,263 B2 | 3/2008 | Kim et al. |
| 7,356,755 B2 | 4/2008 | Fackenthal |
| 7,363,420 B2 | 4/2008 | Lin et al. |
| 7,365,671 B1 | 4/2008 | Anderson |
| 7,388,781 B2 | 6/2008 | Litsyn et al. |
| 7,397,697 B2 | 7/2008 | So et al. |
| 7,405,974 B2 | 7/2008 | Yaoi et al. |
| 7,405,979 B2 | 7/2008 | Ishii et al. |
| 7,408,804 B2 | 8/2008 | Hemink et al. |
| 7,408,810 B2 | 8/2008 | Aritome et al. |
| 7,409,473 B2 | 8/2008 | Conley et al. |
| 7,409,623 B2 | 8/2008 | Baker et al. |
| 7,420,847 B2 | 9/2008 | Li |
| 7,433,231 B2 | 10/2008 | Aritome |
| 7,433,697 B2 | 10/2008 | Karaoguz et al. |
| 7,434,111 B2 | 10/2008 | Sugiura et al. |
| 7,437,498 B2 | 10/2008 | Ronen |
| 7,440,324 B2 | 10/2008 | Mokhlesi |
| 7,440,331 B2 | 10/2008 | Hemink |
| 7,441,067 B2 | 10/2008 | Gorobetz et al. |
| 7,447,970 B2 | 11/2008 | Wu et al. |
| 7,450,421 B2 | 11/2008 | Mokhlesi et al. |
| 7,453,737 B2 | 11/2008 | Ha |
| 7,457,163 B2 | 11/2008 | Hemink |
| 7,457,897 B1 | 11/2008 | Lee et al. |
| 7,460,410 B2 | 12/2008 | Nagai et al. |
| 7,460,412 B2 | 12/2008 | Lee et al. |
| 7,466,592 B2 | 12/2008 | Mitani et al. |
| 7,468,907 B2 | 12/2008 | Kang et al. |
| 7,468,911 B2 | 12/2008 | Lutze et al. |
| 7,469,049 B1 * | 12/2008 | Feng ........................... 380/210 |
| 7,471,581 B2 | 12/2008 | Tran et al. |
| 7,483,319 B2 | 1/2009 | Brown |
| 7,487,329 B2 | 2/2009 | Hepkin et al. |
| 7,487,394 B2 | 2/2009 | Forhan et al. |
| 7,492,641 B2 | 2/2009 | Hosono et al. |
| 7,508,710 B2 | 3/2009 | Mokhlesi |
| 7,526,711 B2 | 4/2009 | Orio |
| 7,539,061 B2 | 5/2009 | Lee |
| 7,539,062 B2 | 5/2009 | Doyle |
| 7,551,492 B2 | 6/2009 | Kim |
| 7,558,109 B2 | 7/2009 | Brandman et al. |
| 7,558,839 B1 | 7/2009 | McGovern |
| 7,568,135 B2 | 7/2009 | Cornwell et al. |
| 7,570,520 B2 | 8/2009 | Kamei et al. |
| 7,574,555 B2 | 8/2009 | Porat et al. |
| 7,590,002 B2 | 9/2009 | Mokhlesi et al. |
| 7,593,259 B2 | 9/2009 | Kim et al. |
| 7,594,093 B1 | 9/2009 | Kancherla |
| 7,596,707 B1 | 9/2009 | Vemula |
| 7,609,787 B2 | 10/2009 | Jahan et al. |
| 7,613,043 B2 | 11/2009 | Cornwell et al. |
| 7,616,498 B2 | 11/2009 | Mokhlesi et al. |
| 7,619,918 B2 | 11/2009 | Aritome |
| 7,631,245 B2 | 12/2009 | Lasser |
| 7,633,798 B2 | 12/2009 | Sarin et al. |
| 7,633,802 B2 | 12/2009 | Mokhlesi |
| 7,639,532 B2 | 12/2009 | Roohparvar et al. |
| 7,644,347 B2 | 1/2010 | Alexander et al. |
| 7,656,734 B2 | 2/2010 | Thorp et al. |
| 7,660,158 B2 | 2/2010 | Aritome |
| 7,660,183 B2 | 2/2010 | Ware et al. |
| 7,661,000 B2 * | 2/2010 | Ueda et al. .................... 713/193 |

| Patent/Pub No. | Date | Name |
|---|---|---|
| 7,661,054 B2 | 2/2010 | Huffman et al. |
| 7,665,007 B2 | 2/2010 | Yang et al. |
| 7,680,987 B1 | 3/2010 | Clark et al. |
| 7,733,712 B1 | 6/2010 | Walston et al. |
| 7,742,351 B2 | 6/2010 | Inoue et al. |
| 7,761,624 B2 | 7/2010 | Karamcheti et al. |
| 7,797,609 B2 | 9/2010 | Neuman |
| 7,810,017 B2 | 10/2010 | Radke |
| 7,848,149 B2 | 12/2010 | Gonzales et al. |
| 7,869,273 B2 | 1/2011 | Lee et al. |
| 7,885,119 B2 | 2/2011 | Li |
| 7,904,783 B2 | 3/2011 | Brandman et al. |
| 7,928,497 B2 | 4/2011 | Yaegashi |
| 7,929,549 B1 * | 4/2011 | Talbot ................ 370/395.7 |
| 7,930,515 B2 | 4/2011 | Gupta et al. |
| 7,945,825 B2 | 5/2011 | Cohen et al. |
| 7,978,516 B2 | 7/2011 | Olbrich et al. |
| 8,014,094 B1 | 9/2011 | Jin |
| 8,037,380 B2 | 10/2011 | Cagno et al. |
| 8,040,744 B2 | 10/2011 | Gorobets et al. |
| 8,065,583 B2 | 11/2011 | Radke |
| 2001/0002172 A1 | 5/2001 | Tanaka et al. |
| 2001/0006479 A1 | 7/2001 | Ikehashi et al. |
| 2002/0038440 A1 | 3/2002 | Barkan |
| 2002/0056064 A1 | 5/2002 | Kidorf et al. |
| 2002/0118574 A1 | 8/2002 | Gongwer et al. |
| 2002/0133684 A1 | 9/2002 | Anderson |
| 2002/0166091 A1 | 11/2002 | Kidorf et al. |
| 2002/0174295 A1 | 11/2002 | Ulrich et al. |
| 2002/0196510 A1 | 12/2002 | Hietala et al. |
| 2003/0002348 A1 | 1/2003 | Chen et al. |
| 2003/0103400 A1 | 6/2003 | Van Tran |
| 2003/0161183 A1 | 8/2003 | Van Tran |
| 2003/0189856 A1 | 10/2003 | Cho et al. |
| 2004/0057265 A1 | 3/2004 | Mirabel et al. |
| 2004/0057285 A1 | 3/2004 | Cernea et al. |
| 2004/0083333 A1 | 4/2004 | Chang et al. |
| 2004/0083334 A1 | 4/2004 | Chang et al. |
| 2004/0105311 A1 | 6/2004 | Cernea et al. |
| 2004/0114437 A1 | 6/2004 | Li |
| 2004/0160842 A1 | 8/2004 | Fukiage |
| 2004/0223371 A1 | 11/2004 | Roohparvar |
| 2005/0007802 A1 | 1/2005 | Gerpheide |
| 2005/0013165 A1 | 1/2005 | Ban |
| 2005/0024941 A1 | 2/2005 | Lasser et al. |
| 2005/0024978 A1 | 2/2005 | Ronen |
| 2005/0030788 A1 | 2/2005 | Parkinson et al. |
| 2005/0086574 A1 | 4/2005 | Fackenthal |
| 2005/0121436 A1 | 6/2005 | Kamitani et al. |
| 2005/0144361 A1 | 6/2005 | Gonzalez et al. |
| 2005/0157555 A1 | 7/2005 | Ono et al. |
| 2005/0162913 A1 | 7/2005 | Chen |
| 2005/0169051 A1 | 8/2005 | Khalid et al. |
| 2005/0189649 A1 | 9/2005 | Maruyama et al. |
| 2005/0213393 A1 | 9/2005 | Lasser |
| 2005/0224853 A1 | 10/2005 | Ohkawa |
| 2005/0240745 A1 | 10/2005 | Iyer et al. |
| 2005/0243626 A1 | 11/2005 | Ronen |
| 2006/0004952 A1 | 1/2006 | Lasser |
| 2006/0028875 A1 | 2/2006 | Avraham et al. |
| 2006/0028877 A1 | 2/2006 | Meir |
| 2006/0101193 A1 | 5/2006 | Murin |
| 2006/0106972 A1 | 5/2006 | Gorobets et al. |
| 2006/0107136 A1 | 5/2006 | Gongwer et al. |
| 2006/0129750 A1 | 6/2006 | Lee et al. |
| 2006/0133141 A1 | 6/2006 | Gorobets |
| 2006/0156189 A1 | 7/2006 | Tomlin |
| 2006/0179334 A1 | 8/2006 | Brittain et al. |
| 2006/0190699 A1 | 8/2006 | Lee |
| 2006/0203546 A1 | 9/2006 | Lasser |
| 2006/0218359 A1 | 9/2006 | Sanders et al. |
| 2006/0221692 A1 | 10/2006 | Chen |
| 2006/0221705 A1 | 10/2006 | Hemink et al. |
| 2006/0221714 A1 | 10/2006 | Li et al. |
| 2006/0239077 A1 | 10/2006 | Park et al. |
| 2006/0239081 A1 | 10/2006 | Roohparvar |
| 2006/0256620 A1 | 11/2006 | Nguyen et al. |
| 2006/0256626 A1 | 11/2006 | Werner et al. |
| 2006/0256891 A1 | 11/2006 | Yuan et al. |
| 2006/0271748 A1 | 11/2006 | Jain et al. |
| 2006/0285392 A1 | 12/2006 | Incarnati et al. |
| 2006/0285396 A1 | 12/2006 | Ha |
| 2007/0006013 A1 | 1/2007 | Moshayedi et al. |
| 2007/0019481 A1 | 1/2007 | Park |
| 2007/0033581 A1 | 2/2007 | Tomlin et al. |
| 2007/0047314 A1 | 3/2007 | Goda et al. |
| 2007/0047326 A1 | 3/2007 | Nguyen et al. |
| 2007/0050536 A1 | 3/2007 | Kolokowsky |
| 2007/0058446 A1 | 3/2007 | Hwang et al. |
| 2007/0061502 A1 | 3/2007 | Lasser et al. |
| 2007/0067667 A1 | 3/2007 | Ikeuchi et al. |
| 2007/0074093 A1 | 3/2007 | Lasser |
| 2007/0086239 A1 | 4/2007 | Litsyn et al. |
| 2007/0086260 A1 | 4/2007 | Sinclair |
| 2007/0089034 A1 | 4/2007 | Litsyn et al. |
| 2007/0091677 A1 | 4/2007 | Lasser et al. |
| 2007/0091694 A1 | 4/2007 | Lee et al. |
| 2007/0103978 A1 | 5/2007 | Conley et al. |
| 2007/0103986 A1 | 5/2007 | Chen |
| 2007/0104211 A1 | 5/2007 | Opsasnick |
| 2007/0109845 A1 | 5/2007 | Chen |
| 2007/0109849 A1 | 5/2007 | Chen |
| 2007/0115726 A1 | 5/2007 | Cohen et al. |
| 2007/0118713 A1 | 5/2007 | Guterman et al. |
| 2007/0143378 A1 | 6/2007 | Gorobets |
| 2007/0143531 A1 | 6/2007 | Atri |
| 2007/0159889 A1 | 7/2007 | Kang et al. |
| 2007/0159892 A1 | 7/2007 | Kang et al. |
| 2007/0159907 A1 | 7/2007 | Kwak |
| 2007/0168837 A1 | 7/2007 | Murin |
| 2007/0171714 A1 | 7/2007 | Wu et al. |
| 2007/0183210 A1 | 8/2007 | Choi et al. |
| 2007/0189073 A1 | 8/2007 | Aritome |
| 2007/0195602 A1 | 8/2007 | Fong et al. |
| 2007/0206426 A1 | 9/2007 | Mokhlesi |
| 2007/0208904 A1 | 9/2007 | Hsieh et al. |
| 2007/0226599 A1 | 9/2007 | Motwani |
| 2007/0236990 A1 | 10/2007 | Aritome |
| 2007/0253249 A1 | 11/2007 | Kang et al. |
| 2007/0256620 A1 | 11/2007 | Viggiano et al. |
| 2007/0263455 A1 | 11/2007 | Cornwell et al. |
| 2007/0266232 A1 | 11/2007 | Rodgers et al. |
| 2007/0271424 A1 | 11/2007 | Lee et al. |
| 2007/0280000 A1 | 12/2007 | Fujiu et al. |
| 2007/0291571 A1 | 12/2007 | Balasundaram |
| 2007/0297234 A1 | 12/2007 | Cernea et al. |
| 2008/0010395 A1 | 1/2008 | Mylly et al. |
| 2008/0025121 A1 | 1/2008 | Tanzawa |
| 2008/0043535 A1 | 2/2008 | Roohparvar |
| 2008/0049504 A1 | 2/2008 | Kasahara et al. |
| 2008/0049506 A1 | 2/2008 | Guterman |
| 2008/0052446 A1 | 2/2008 | Lasser et al. |
| 2008/0055993 A1 | 3/2008 | Lee |
| 2008/0080243 A1 | 4/2008 | Edahiro et al. |
| 2008/0082730 A1 | 4/2008 | Kim et al. |
| 2008/0089123 A1 | 4/2008 | Chae et al. |
| 2008/0104309 A1 | 5/2008 | Cheon et al. |
| 2008/0104312 A1 | 5/2008 | Lasser |
| 2008/0109590 A1 | 5/2008 | Jung et al. |
| 2008/0115017 A1 | 5/2008 | Jacobson |
| 2008/0123420 A1 | 5/2008 | Brandman et al. |
| 2008/0123426 A1 | 5/2008 | Lutze et al. |
| 2008/0126686 A1 | 5/2008 | Sokolov et al. |
| 2008/0130341 A1 | 6/2008 | Shalvi et al. |
| 2008/0148115 A1 | 6/2008 | Sokolov et al. |
| 2008/0151618 A1 | 6/2008 | Sharon et al. |
| 2008/0151667 A1 | 6/2008 | Miu et al. |
| 2008/0158958 A1 | 7/2008 | Sokolov et al. |
| 2008/0181001 A1 | 7/2008 | Shalvi |
| 2008/0198650 A1 | 8/2008 | Shalvi et al. |
| 2008/0198654 A1 | 8/2008 | Toda |
| 2008/0209116 A1 | 8/2008 | Caulkins |
| 2008/0209304 A1 | 8/2008 | Winarski et al. |
| 2008/0215798 A1 | 9/2008 | Sharon et al. |
| 2008/0217598 A1 | 9/2008 | Sharon et al. |
| 2008/0219050 A1 | 9/2008 | Shalvi et al. |
| 2008/0239093 A1 | 10/2008 | Easwar et al. |
| 2008/0239812 A1 | 10/2008 | Abiko et al. |

| | | | |
|---|---|---|---|
| 2008/0253188 A1 | 10/2008 | Aritome | |
| 2008/0263262 A1 | 10/2008 | Sokolov et al. | |
| 2008/0263676 A1 | 10/2008 | Mo et al. | |
| 2008/0270730 A1 | 10/2008 | Lasser et al. | |
| 2008/0282106 A1 | 11/2008 | Shalvi et al. | |
| 2008/0288714 A1 | 11/2008 | Salomon et al. | |
| 2009/0013233 A1 | 1/2009 | Radke | |
| 2009/0024905 A1 | 1/2009 | Shalvi et al. | |
| 2009/0034337 A1 | 2/2009 | Aritome | |
| 2009/0043831 A1 | 2/2009 | Antonopoulos et al. | |
| 2009/0043951 A1 | 2/2009 | Shalvi et al. | |
| 2009/0049234 A1 | 2/2009 | Oh et al. | |
| 2009/0073762 A1 | 3/2009 | Lee et al. | |
| 2009/0086542 A1 | 4/2009 | Lee et al. | |
| 2009/0089484 A1 | 4/2009 | Chu | |
| 2009/0091979 A1 | 4/2009 | Shalvi | |
| 2009/0094930 A1 | 4/2009 | Schwoerer | |
| 2009/0106485 A1 | 4/2009 | Anholt | |
| 2009/0112949 A1 | 4/2009 | Ergan et al. | |
| 2009/0132755 A1 | 5/2009 | Radke | |
| 2009/0144600 A1 | 6/2009 | Perlmutter et al. | |
| 2009/0150894 A1 | 6/2009 | Huang et al. | |
| 2009/0157950 A1 | 6/2009 | Selinger | |
| 2009/0157964 A1 | 6/2009 | Kasorla et al. | |
| 2009/0158126 A1 | 6/2009 | Perlmutter et al. | |
| 2009/0168524 A1 | 7/2009 | Golov et al. | |
| 2009/0172257 A1 | 7/2009 | Prins et al. | |
| 2009/0172261 A1 | 7/2009 | Prins et al. | |
| 2009/0193184 A1 | 7/2009 | Yu et al. | |
| 2009/0199074 A1 | 8/2009 | Sommer | |
| 2009/0204824 A1* | 8/2009 | Lin et al. | 713/193 |
| 2009/0204872 A1 | 8/2009 | Yu et al. | |
| 2009/0213653 A1 | 8/2009 | Perlmutter et al. | |
| 2009/0213654 A1 | 8/2009 | Perlmutter et al. | |
| 2009/0225595 A1 | 9/2009 | Kim | |
| 2009/0228761 A1 | 9/2009 | Perlmutter et al. | |
| 2009/0240872 A1 | 9/2009 | Perlmutter et al. | |
| 2009/0265509 A1 | 10/2009 | Klein | |
| 2009/0300227 A1 | 12/2009 | Nochimowski et al. | |
| 2009/0323412 A1 | 12/2009 | Mokhlesi et al. | |
| 2009/0327608 A1 | 12/2009 | Eschmann | |
| 2010/0017650 A1 | 1/2010 | Chin et al. | |
| 2010/0034022 A1 | 2/2010 | Dutta et al. | |
| 2010/0057976 A1 | 3/2010 | Lasser | |
| 2010/0061151 A1 | 3/2010 | Miwa et al. | |
| 2010/0082883 A1 | 4/2010 | Chen et al. | |
| 2010/0083247 A1 | 4/2010 | Kanevsky et al. | |
| 2010/0110580 A1 | 5/2010 | Takashima | |
| 2010/0131697 A1 | 5/2010 | Alrod et al. | |
| 2010/0142268 A1 | 6/2010 | Aritome | |
| 2010/0142277 A1 | 6/2010 | Yang et al. | |
| 2010/0169547 A1 | 7/2010 | Ou | |
| 2010/0169743 A1 | 7/2010 | Vogan et al. | |
| 2010/0174847 A1 | 7/2010 | Paley et al. | |
| 2010/0211803 A1* | 8/2010 | Lablans | 713/193 |
| 2010/0287217 A1 | 11/2010 | Borchers et al. | |
| 2011/0010489 A1 | 1/2011 | Yeh | |
| 2011/0060969 A1 | 3/2011 | Ramamoorthy et al. | |
| 2011/0066793 A1 | 3/2011 | Burd | |
| 2011/0075482 A1 | 3/2011 | Shepard et al. | |
| 2011/0107049 A1 | 5/2011 | Kwon et al. | |
| 2011/0149657 A1 | 6/2011 | Haratsch et al. | |
| 2011/0199823 A1 | 8/2011 | Bar-Or et al. | |
| 2011/0302354 A1 | 12/2011 | Miller | |

FOREIGN PATENT DOCUMENTS

| | | |
|---|---|---|
| EP | 1434236 B1 | 6/2004 |
| EP | 1605509 A1 | 12/2005 |
| WO | 9610256 A1 | 4/1996 |
| WO | 98028745 A1 | 7/1998 |
| WO | 02100112 A1 | 12/2002 |
| WO | 2003100791 A1 | 12/2003 |
| WO | 2007046084 A2 | 4/2007 |
| WO | 2007132452 A2 | 11/2007 |
| WO | 2007132453 A2 | 11/2007 |
| WO | 2007132456 A2 | 11/2007 |
| WO | 2007132457 A2 | 11/2007 |
| WO | 2007132458 A2 | 11/2007 |
| WO | 2007146010 A2 | 12/2007 |
| WO | 2008026203 A2 | 3/2008 |
| WO | 2008053472 A2 | 5/2008 |
| WO | 2008053473 A2 | 5/2008 |
| WO | 2008068747 A2 | 6/2008 |
| WO | 2008077284 A1 | 7/2008 |
| WO | 2008083131 A2 | 7/2008 |
| WO | 2008099958 A1 | 8/2008 |
| WO | 2008111058 A2 | 9/2008 |
| WO | 2008124760 A2 | 10/2008 |
| WO | 2008139441 A2 | 11/2008 |
| WO | 2009037691 A2 | 3/2009 |
| WO | 2009037697 A2 | 3/2009 |
| WO | 2009038961 A2 | 3/2009 |
| WO | 2009050703 A2 | 4/2009 |
| WO | 2009053961 A2 | 4/2009 |
| WO | 2009053962 A2 | 4/2009 |
| WO | 2009053963 A2 | 4/2009 |
| WO | 2009063450 A2 | 5/2009 |
| WO | 2009072100 A2 | 6/2009 |
| WO | 2009072101 A2 | 6/2009 |
| WO | 2009072102 A2 | 6/2009 |
| WO | 2009072103 A2 | 6/2009 |
| WO | 2009072104 A2 | 6/2009 |
| WO | 2009072105 A2 | 6/2009 |
| WO | 2009074978 A2 | 6/2009 |
| WO | 2009074979 A2 | 6/2009 |
| WO | 2009078006 A2 | 6/2009 |
| WO | 2009095902 A2 | 8/2009 |
| WO | 2011024015 A1 | 3/2011 |

OTHER PUBLICATIONS

U.S. Appl. No. 12/332,368 Office Action dated Nov. 10, 2011.
U.S. Appl. No. 12/063,544 Office Action dated Dec. 14, 2011.
U.S. Appl. No. 12/186,867 Office Action dated Jan. 17, 2012.
U.S. Appl. No. 12/119,069 Office Action dated Nov. 14, 2011.
U.S. Appl. No. 12/037,487 Office Action dated Jan. 3, 2012.
U.S. Appl. No. 11/995,812 Office Action dated Oct. 28, 2011.
U.S. Appl. No. 12/551,567 Office Action dated Oct. 27, 2011.
U.S. Appl. No. 12/618,732 Office Action dated Nov. 4, 2011.
U.S. Appl. No. 12/649,382 Office Action dated Jan. 6, 2012.
U.S. Appl. No. 13/284,909, filed Oct. 30, 2011.
U.S. Appl. No. 13/284,913, filed Oct. 30, 2011.
U.S. Appl. No. 13/338,335, filed Dec. 28, 2011.
U.S. Appl. No. 13/355,536, filed Jan. 22, 2012.
Kim et al., "Multi-bit Error Tolerant Caches Using Two-Dimensional Error Coding", Proceedings of the 40th Annual ACM/IEEE International Symposium on Microarchitecture (MICRO-40), Chicago, USA, Dec. 1-5, 2007.
U.S. Appl. No. 12/019,011 Official Action dated Nov. 20, 2009.
Takeuchi et al., "A Multipage Cell Architecture for High-Speed Programming Multilevel NAND Flash Memories", IEEE Journal of Solid State Circuits, vol. 33, No. 8, Aug. 1998.
JEDEC Standard JESD84-C44, "Embedded MultiMediaCard (e•MMC) Mechanical Standard, with Optional Reset Signal", Jedec Solid State Technology Association, USA, Jul. 2009.
JEDEC, "UFS Specification", version 0.1, Nov. 11, 2009.
SD Group and SD Card Association, "SD Specifications Part 1 Physical Layer Specification", version 3.01, draft 1.00, Nov. 9, 2009.
Compaq et al., "Universal Serial Bus Specification", revision 2.0, Apr. 27, 2000.
Serial ATA International Organization, "Serial ATA Revision 3.0 Specification", Jun. 2, 2009.
Gotou, H., "An Experimental Confirmation of Automatic Threshold Voltage Convergence in a Flash Memory Using Alternating Word-Line Voltage Pulses", IEEE Electron Device Letters, vol. 18, No. 10, pp. 503-505, Oct. 1997.
U.S. Appl. No. 12/534,898 Official Action dated Mar. 23, 2011.
U.S. Appl. No. 13/047,822, filed Mar. 15, 2011.
U.S. Appl. No. 13/069,406, filed Mar. 23, 2011.
U.S. Appl. No. 13/088,361, filed Apr. 17, 2011.
Ankolekar et al., "Multibit Error-Correction Methods for Latency-Constrained Flash Memory Systems", IEEE Transactions on Device and Materials Reliability, vol. 10, No. 1, pp. 33-39, Mar. 2010.
U.S. Appl. No. 12/344,233 Official Action dated Jun. 24, 2011.
U.S. Appl. No. 11/995,813 Official Action dated Jun. 16, 2011.

Berman et al., "Mitigating Inter-Cell Coupling Effects in MLC NAND Flash via Constrained Coding", Flash Memory Summit, Santa Clara, USA, Aug. 19, 2010.

U.S. Appl. No. 12/178,318 Official Action dated May 31, 2011.

CN Patent Application No. 200780026181.3 Official Action dated Apr. 8, 2011.

Huffman, A., "Non-Volatile Memory Host Controller Interlace (NVMHCI)", Specification 1.0, Apr. 14, 2008.

Panchbhai et al., "Improving Reliability of NAND Based Flash Memory Using Hybrid SLC/MLC Device", Project Proposal for CSci 8980—Advanced Storage Systems, University of Minnesota, USA, Spring 2009.

U.S. Appl. No. 11/957,970 Official Action dated May 20, 2010.

Shalvi et al., U.S. Appl. No. 12/822,207 "Adaptive Over-Provisioning in Memory Systems" filed Jun. 24, 2010.

Wei, L., "Trellis-Coded Modulation With Multidimensional Constellations", IEEE Transactions on Information Theory, vol. IT-33, No. 4, pp. 483-501, Jul. 1987.

U.S. Appl. No. 13/114,049 Official Action dated Sep 12, 2011.

U.S. Appl. No. 12/405,275 Official Action dated Jul. 29, 2011.

Conway et al., "Sphere Packings, Lattices and Groups", 3rd edition, chapter 4, pp. 94-135, Springer, New York, USA 1998.

Chinese Patent Application No. 200780040493.X Official Action dated Jun. 15, 2011.

U.S. Appl. No. 12/037,487 Official Action dated Oct. 3, 2011.

U.S. Appl. No. 12/649,360 Official Action dated Aug. 9, 2011.

U.S. Appl. No. 13/192,504, filed Jul. 28, 2011.

U.S. Appl. No. 13/192,852, filed Aug. 2, 2011.

U.S. Appl. No. 13/231,963, filed Sep. 14, 2011.

U.S. Appl. No. 13/239,408, filed Sep. 22, 2011.

U.S. Appl. No. 13/239,411, filed Sep. 22, 2011.

U.S. Appl. No. 13/214,257, filed Aug. 22, 2011.

U.S. Appl. No. 13/192,501, filed Jul. 28, 2011.

U.S. Appl. No. 13/192,495, filed Jul. 28, 2011.

Hong et al., "NAND Flash-based Disk Cache Using SLC/MLC Combined Flash Memory", 2010 International Workshop on Storage Network Architecture and Parallel I/Os, pp. 21-30, USA, May 3, 2010.

U.S. Appl. No. 11/945,575 Official Action dated Aug. 24, 2010.

U.S. Appl. No. 12/045,520 Official Action dated Nov. 16, 2010.

Agrell et al., "Closest Point Search in Lattices", IEEE Transactions on Information Theory, vol. 48, No. 8, pp. 2201-2214, Aug. 2002.

Bez et al., "Introduction to Flash memory", Proceedings of the IEEE, vol. 91, No. 4, pp. 489-502, Apr. 2003.

Blahut, R.E., "Theory and Practice of Error Control Codes," Addison-Wesley, May 1984, section 3.2, pp. 47-48.

Chang, L "Hybrid Solid State Disks: Combining Heterogeneous NAND Flash in Large SSDs", ASPDAC, Jan. 2008.

Cho et al., "Multi-Level NAND Flash Memory with Non-Uniform Threshold Voltage Distribution," IEEE International Solid-State Circuits Conference (ISSCC), San Francisco, CA, Feb. 5-7, 2001, pp. 28-29 and 424.

Databahn™, "Flash memory controller IP", Denali Software, Inc., 1994 https://www.denali.com/en/products/databahn_flash.jsp.

Datalight, Inc., "FlashFX Pro 3.1 High Performance Flash Manager for Rapid Development of Reliable Products", Nov. 16, 2006.

Duann, N., Silicon Motion Presentation "SLC & MLC Hybrid", Flash Memory Summit, Santa Clara, USA, Aug. 2008.

Eitan et al., "Can NROM, a 2-bit, Trapping Storage NVM Cell, Give a Real Challenge to Floating Gate Cells?", Proceedings of the 1999 International Conference on Solid State Devices and Materials (SSDM), pp. 522-524, Tokyo, Japan 1999.

Eitan et al., "Multilevel Flash Cells and their Trade-Offs", Proceedings of the 1996 IEEE International Electron Devices Meeting (IEDM), pp. 169-172, New York, USA 1996.

Engh et al., "A self adaptive programming method with 5 mV accuracy for multi-level storage in Flash", pp. 115-118, Proceedings of the IEEE 2002 Custom Integrated Circuits Conference, May 12-15, 2002.

Goodman et al., "On-Chip ECC for Multi-Level Random Access Memories," Proceedings of the IEEE/CAM Information Theory Workshop, Ithaca, USA, Jun. 25-29, 1989.

Han et al., "An Intelligent Garbage Collection Algorithm for Flash Memory Storages", Computational Science and Its Applications—ICCSA 2006, vol. 3980/2006, pp. 1019-1027, Springer Berlin / Heidelberg, Germany, May 11, 2006.

Han et al., "CATA: A Garbage Collection Scheme for Flash Memory File Systems", Ubiquitous Intelligence and Computing, vol. 4159/2006, pp. 103-112, Springer Berlin / Heidelberg, Aug. 25, 2006.

Horstein, "On the Design of Signals for Sequential and Nonsequential Detection Systems with Feedback," IEEE Transactions on Information Theory IT-12:4 (Oct. 1966), pp. 448-455.

Jung et al., in "A 117 mm.sup.2 3.3V Only 128 Mb Multilevel NAND Flash Memory for Mass Storage Applications," IEEE Journal of Solid State Circuits, (11:31), Nov. 1996, pp. 1575-1583.

Kawaguchi et al. 1995. A flash-memory based file system. In Proceedings of the USENIX 1995 Technical Conference, New Orleans, Louisiana. 155-164.

Kim et al., "Future Memory Technology including Emerging New Memories", Proceedings of the 24th International Conference on Microelectronics (MIEL), vol. 1, pp. 377-384, Nis, Serbia and Montenegro, May 16-19, 2004.

Lee et al., "Effects of Floating Gate Interference on NAND Flash Memory Cell Operation", IEEE Electron Device Letters, vol. 23, No. 5, pp. 264-266, May 2002.

Maayan et al., "A 512 Mb NROM Flash Data Storage Memory with 8 MB/s Data Rate", Proceedings of the 2002 IEEE International Solid-State circuits Conference (ISSCC 2002), pp. 100-101, San Francisco, USA, Feb. 3-7, 2002.

Mielke et al., "Recovery Effects in the Distributed Cycling of Flash Memories", IEEE 44th Annual International Reliability Physics Symposium, pp. 29-35, San Jose, USA, Mar. 2006.

Onfi, "Open NAND Flash Interface Specification," revision 1.0, Dec. 28, 2006.

Phison Electronics Corporation, "PS8000 Controller Specification (for SD Card)", revision 1.2, Document No. S-07018, Mar. 28, 2007.

Shalvi, et al., "Signal Codes," Proceedings of the 2003 IEEE Information Theory Workshop (ITW'2003), Paris, France, Mar. 31-Apr. 4, 2003.

Shiozaki, A., "Adaptive Type-II Hybrid Broadcast ARQ System", IEEE Transactions on Communications, vol. 44, Issue 4, pp. 420-422, Apr. 1996.

Suh et al., "A 3.3V 32Mb NAND Flash Memory with Incremental Step Pulse Programming Scheme", IEEE Journal of Solid-State Circuits, vol. 30, No. 11, pp. 1149-1156, Nov. 1995.

ST Microelectronics, "Bad Block Management in NAND Flash Memories", Application note AN-1819, Geneva, Switzerland, May, 2004.

ST Microelectronics, "Wear Leveling in Single Level Cell NAND Flash Memories," Application note AN-1822 Geneva, Switzerland, Feb. 2007.

Takeuchi et al., "A Double Level $V_{TH}$ Select Gate Array Architecture for Multi-Level NAND Flash Memories", Digest of Technical Papers, 1995 Symposium on VLSI Circuits, pp. 69-70, Jun. 8-10, 1995.

Wu et al., "eNVy: A non-Volatile, Main Memory Storage System", Proceedings of the 6th International Conference on Architectural support for programming languages and operating systems, pp. 86-87, San Jose, USA, 1994.

International Application PCT/IL2007/000575 Patentability report dated Mar. 26, 2009.

International Application PCT/IL2007/000575 Search Report dated May 30, 2008.

International Application PCT/IL2007/000576 Patentability Report dated Mar. 19, 2009.

International Application PCT/IL2007/000576 Search Report dated Jul. 7, 2008.

International Application PCT/IL2007/000579 Patentability report dated Mar. 10, 2009.

International Application PCT/IL2007/000579 Search report dated Jul. 3, 2008.

International Application PCT/IL2007/000580 Patentability Report dated Mar. 10, 2009.

International Application PCT/IL2007/000580 Search Report dated Sep. 11, 2008.

International Application PCT/IL2007/000581 Patentability Report dated Mar. 26, 2009.

International Application PCT/IL2007/000581 Search Report dated Aug. 25, 2008.
International Application PCT/IL2007/001059 Patentability report dated Apr. 19, 2009.
International Application PCT/IL2007/001059 Search report dated Aug. 7, 2008.
International Application PCT/IL2007/001315 search report dated Aug. 7, 2008.
International Application PCT/IL2007/001315 Patentability Report dated May 5, 2009.
International Application PCT/IL2007/001316 Search report dated Jul. 22, 2008.
International Application PCT/IL2007/001316 Patentability Report dated May 5, 2009.
International Application PCT/IL2007/001488 Search report dated Jun. 20, 2008.
International Application PCT/IL2008/000329 Search report dated Nov. 25, 2008.
International Application PCT/IL2008/000519 Search report dated Nov. 20, 2008.
International Application PCT/IL2008/001188 Search Report dated Jan. 28, 2009.
International Application PCT/IL2008/001356 Search Report dated Feb. 3, 2009.
International Application PCT/IL2008/001446 Search report dated Feb. 20, 2009.
U.S. Appl. No. 11/949,135 Official Action dated Oct. 2, 2009.
Sommer, N., U.S. Appl. No. 12/171,797 "Memory Device with Non-Uniform Programming Levels" filed Jul. 11, 2008.
Shalvi et al., U.S. Appl. No. 12/251,471 "Compensation for Voltage Drifts in Analog Memory Cells" filed Oct. 15, 2008.
Sommer et al., U.S. Appl. No. 12/497,707 "Data Storage in Analog Memory Cells with Protection Against Programming Interruption" filed Jul. 6, 2009.
Winter et al., U.S. Appl. No. 12/534,898 "Data Storage Using Modified Voltages" filed Aug. 4, 2009.
Winter et al., U.S. Appl. No. 12/534,893 "Improved Data Storage in Analog Memory Cells Using Modified Pass Voltages" filed Aug. 4, 2009.
Shalvi et al., U.S. Appl. No. 12/551,583 "Segmented Data Storage" filed Sep. 1, 2009.
Shalvi et al., U.S. Appl. No. 12/551,567 "Reliable Data Storage in Analog Memory Cells Subjected to Long Retention Periods" filed Sep. 1, 2009.
Perlmutter et al., U.S. Appl. No. 12/558,528 "Estimation of Memory Cell Read Thresholds by Sampling Inside Programming Level Distribution Intervals" filed Sep. 13, 2009.
Sokolov, D., U.S. Appl. No. 12/579,430 "Efficient Programming of Analog Memory Cell Devices" filed Oct. 15, 2009.
Shalvi, O., U.S. Appl. No. 12/579,432 "Efficient Data Storage in Storage Device Arrays" filed Oct. 15, 2009.
Sommer et al., U.S. Appl. No. 12/607,078 "Data Scrambling in Memory Devices" filed Oct. 28, 2009.
U.S. Appl. No. 12/880,101 "Reuse of Host Hibernation Storage Space by Memory Controller", filed Sep. 12, 2010.
U.S. Appl. No. 12/890,724 "Error Correction Coding Over Multiple Memory Pages", filed Sep. 27, 2010.
U.S. Appl. No. 12/171,797 Official Action dated Aug. 25, 2010.
U.S. Appl. No. 12/497,707 Official Action dated Sep. 15, 2010.
U.S. Appl. No. 11/995,801 Official Action dated Oct. 15, 2010.
Numonyx, "M25PE16: 16-Mbit, page-erasable serial flash memory with byte-alterability, 75 MHz SPI bus, standard pinout", Apr. 2008.
U.S. Appl. No. 11/995,814 Official Action dated Dec. 17, 2010.
U.S. Appl. No. 12/388,528 Official Action dated Nov. 29, 2010.
U.S. Appl. No. 12/251,471 Official Action dated Jan. 3, 2011.
Engineering Windows 7, "Support and Q&A for Solid-State Drives", e7blog, May 5, 2009.
Micron Technology Inc., "Memory Management in NAND Flash Arrays", Technical Note, year 2005.
Kang et al., "A Superblock-based Flash Translation Layer for NAND Flash Memory", Proceedings of the 6th ACM & IEEE International Conference on Embedded Software, pp. 161-170, Seoul, Korea, Oct. 22-26, 2006.
Park et al., "Sub-Grouped Superblock Management for High-Performance Flash Storages", IEICE Electronics Express, vol. 6, No. 6, pp. 297-303, Mar. 25, 2009.
"How to Resolve "Bad Super Block: Magic Number Wrong" in BSD", Free Online Articles Director Article Base, posted Sep. 5, 2009.
Ubuntu Forums, "Memory Stick Failed IO Superblock", posted Nov. 11, 2009.
Super User Forums, "SD Card Failure, can't read superblock", posted Aug. 8, 2010.
U.S. Appl. No. 12/987,174, filed Jan. 10, 2011.
U.S. Appl. No. 12/987,175, filed Jan. 10, 2011.
U.S. Appl. No. 12/963,649, filed Dec. 9, 2010.
U.S. Appl. No. 13/021,754, filed Feb. 6, 2011.
U.S. Appl. No. 12/323,544 Official Action dated Mar. 9, 2012.
Chinese Patent Application No. 200780026181.3 Official Action dated Mar. 7, 2012.
Chinese Patent Application No. 200780026094.8 Official Action dated Feb. 2, 2012.
U.S. Appl. No. 12/332,370 Official Action dated Mar. 8, 2012.
U.S. Appl. No. 12/579,432 Official Action dated Feb. 29, 2012.
U.S. Appl. No. 12/522,175 Official Action dated Mar. 27, 2012.
SAS Protocol, "Information Technology—Serial Attached SCSI—2 (SAS-2)", INCITS document T10/1760-D, revision 15a, Feb. 22, 2009.
Budilovsky et al., "Prototyping a High-Performance Low-Cost Solid-State Disk", SYSTOR—The 4th Annual International Systems and Storage Conference, Haifa, Israel, May 30-Jun. 1, 2011.
NVM Express Protocol, "NVM Express", Revision 1.0b, Jul. 12, 2011.
SCSI Protocol, "Information Technology—SCSI Architecture Model—5 (SAM-5)", INCITS document T10/2104-D, revision 01, Jan. 28, 2009.
US 7,161,836, 01/2007, Wan et al. (withdrawn)

* cited by examiner

FIG. 6
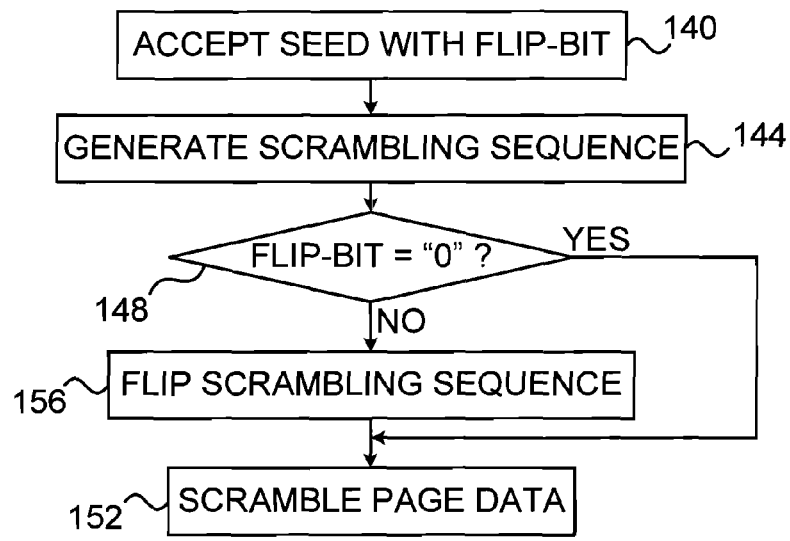
FIG. 7
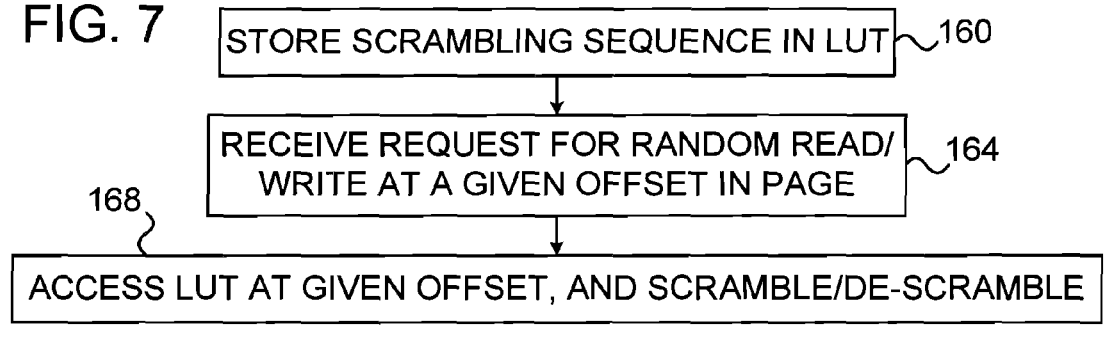
FIG. 8

DATA SCRAMBLING SCHEMES FOR MEMORY DEVICES

CROSS-REFERENCE TO RELATED APPLICATIONS

This application claims the benefit of U.S. Provisional Patent Application 61/109,767, filed Oct. 30, 2008, and U.S. Provisional Patent Application 61/115,085, filed Nov. 16, 2008, whose disclosures are incorporated herein by reference. This application is related to a U.S. patent application entitled "Data Scrambling in Memory Devices," filed on even date, which is assigned to the assignee of the present patent application and whose disclosure is incorporated herein by reference.

FIELD OF THE INVENTION

The present invention relates generally to data storage, and particularly to methods and systems for data scrambling in memory devices.

BACKGROUND OF THE INVENTION

Several types of memory devices, such as Flash memories, use arrays of analog memory cells for storing data. Each analog memory cell stores a quantity of an analog value, also referred to as a storage value, such as an electrical charge or voltage. This analog value represents the information stored in the cell. In Flash memories, for example, each analog memory cell holds a certain amount of electrical charge. The range of possible analog values is typically divided into intervals, each interval corresponding to one or more data bit values. Data is written to an analog memory cell by writing a nominal analog value that corresponds to the desired bit or bits.

Some memory devices, commonly referred to as Single-Level Cell (SLC) devices, store a single bit of information in each memory cell, i.e., each memory cell can be programmed to assume two possible programming levels. Higher-density devices, often referred to as Multi-Level Cell (MLC) devices, store two or more bits per memory cell, i.e., can be programmed to assume more than two possible programming levels.

Flash memory devices are described, for example, by Bez et al., in "Introduction to Flash Memory," Proceedings of the IEEE, volume 91, number 4, April, 2003, pages 489-502, which is incorporated herein by reference. Multi-level Flash cells and devices are described, for example, by Eitan et al., in "Multilevel Flash Cells and their Trade-Offs," Proceedings of the 1996 IEEE International Electron Devices Meeting (IEDM), New York, N.Y., pages 169-172, which is incorporated herein by reference. The paper compares several kinds of multilevel Flash cells, such as common ground, DINOR, AND, NOR and NAND cells.

Eitan et al., describe another type of analog memory cell called Nitride Read Only Memory (NROM) in "Can NROM, a 2-bit, Trapping Storage NVM Cell, Give a Real Challenge to Floating Gate Cells?" Proceedings of the 1999 International Conference on Solid State Devices and Materials (SSDM), Tokyo, Japan, Sep. 21-24, 1999, pages 522-524, which is incorporated herein by reference. NROM cells are also described by Maayan et al., in "A 512 Mb NROM Flash Data Storage Memory with 8 MB/s Data Rate", Proceedings of the 2002 IEEE International Solid-State Circuits Conference (ISSCC 2002), San Francisco, Calif., Feb. 3-7, 2002, pages 100-101, which is incorporated herein by reference.

Other exemplary types of analog memory cells are Floating Gate (FG) cells, Ferroelectric RAM (FRAM) cells, magnetic RAM (MRAM) cells, Charge Trap Flash (CTF) and phase change RAM (PRAM, also referred to as Phase Change Memory—PCM) cells. FRAM, MRAM and PRAM cells are described, for example, by Kim and Koh in "Future Memory Technology including Emerging New Memories," Proceedings of the 24$^{th}$ International Conference on Microelectronics (MIEL), Nis, Serbia and Montenegro, May 16-19, 2004, volume 1, pages 377-384, which is incorporated herein by reference.

Some memory systems scramble, or randomize, the data before storing it in memory. For example, U.S. Patent Application Publication 2008/0215798, whose disclosure is incorporated herein by reference, describes randomization schemes, in which original data to be stored in a non-volatile memory are first randomized while preserving the size of the original data. In response for a request for the original data, the randomized data are retrieved, de-randomized and exported without authenticating the requesting entity. ECC encoding is applied either before or after randomizing. Correspondingly, ECC decoding is applied either after or before de-randomizing.

U.S. Patent Application Publication 2009/0204824, whose disclosure is incorporated herein by reference, describes data scrambling techniques implemented externally to a Flash memory device. The data scrambling technique preferably uses a logical address, such as logical block address or logical page address, rather than a physical address, to determine a seed scrambling key.

PCT International Publication WO 2008/099958, whose disclosure is incorporated herein by reference, describes a method of writing data into a semiconductor memory, in which nonvolatile memory cells each having a gate connected to a word line are connected in series. A scrambling method for the data is selected according to a word line address of the memory cells into which the data is to be written. The data is scrambled using the selected scrambling method, and the scrambled data is written into the memory cells according to the word line address.

U.S. Pat. No. 4,993,029, whose disclosure is incorporated herein by reference, describes a method and apparatus for randomizing data in a direct access storage device. The data is randomized, and subsequently de-randomized, in a repeating or pseudo-random, complementary sequence for each byte. The complementary randomizing/de-randomizing sequence is determined by the count contained in a counter. This counter is initialized at the beginning of a record, and is progressively incremented to the predetermined next count as each byte is processed.

SUMMARY OF THE INVENTION

An embodiment of the present invention provides a method for data storage, including:

defining a set of scrambling sequences, each sequence including bits in respective bit positions having bit values, such that a distribution of the bit values in any give bit position satisfies a predefined statistical criterion;

scrambling each data word using a respective scrambling sequence selected from the set; and storing the scrambled data words in the memory device.

In some embodiments, the statistical criterion specifies that half of the bit values in any given bit position are "0" and the other half of the bit values are "1". In an embodiment, defining the set includes specifying the set to include a group of the scrambling sequences, and respective inverses of the scrambling sequences in the group.

In a disclosed embodiment, specifying the set includes defining a scrambling seed including multiple bits, each combination of values of the bits defining a respective scrambling sequence, adding to the scrambling seed an additional bit, which selects between the respective scrambling sequence and an inverse of the respective scrambling sequence, and generating the scrambling sequences in the set using the scrambling seed, including the additional bit.

There is additionally provided, in accordance with an embodiment of the present invention, a method for data storage, including:

storing in a memory controller at least a part of a scrambling sequence that was used in scrambling a given memory page that is stored in a memory device;

accepting in the memory controller a request to access a specified portion of the given memory page in the memory device; and in response to the request, accessing the specified portion of the memory page by retrieving a corresponding portion of the scrambling sequence stored in the memory controller, and applying the retrieved portion of the scrambling sequence to the portion of the memory page.

In some embodiments, accessing the portion includes one of reading the portion and writing into the portion. In an embodiment, the scrambling sequence is generated by a sequence generator, storing the part of the scrambling sequence includes storing multiple states of the sequence generator at respective multiple offsets along the scrambling sequence, and accessing the portion includes retrieving a given state of the sequence generator, which corresponds to an offset that is smaller than a beginning of the portion, and causing the sequence generator to generate the scrambling sequence starting from the given offset.

There is also provided, in accordance with an embodiment of the present invention, a method for data storage, including:

encoding data for storage in a memory device using an Error Correction Code (ECC) so as to produce ECC-encoded data;

encoding a scrambling sequence with the ECC so as to produce an ECC-encoded scrambling sequence;

calculating a bit-wise Exclusive Or (XOR) between the ECC-encoded data and the ECC-encoded scrambling sequence so as to produce a result; and storing the result in the memory device.

In some embodiment, encoding the scrambling sequence includes scrambling the data using two or more candidate scrambling sequences so as to produce respective scrambled data sequences, selecting one of the scrambling sequences based on a condition defined over the scrambled data sequences, and encoding the selected scrambling sequence to produce the ECC-encoded scrambling sequence. In some embodiments, scrambling the data and selecting the scrambling sequence are performed at least partly in parallel to encoding the data with the ECC.

There is further provided, in accordance with an embodiment of the present invention, a method for data storage, including:

scrambling data for storage using a scrambling seed;

encoding both the scrambled data and the scrambling seed using an Error Correction Code (ECC); and storing the encoded scrambled data and the encoded scrambling seed in a memory.

In some embodiments, the method includes, after storing the data, retrieving the data by reading the encoded scrambled data and the encoded scrambling seed from the memory, decoding the ECC-encoded scrambled data and ECC-encoded scrambling seed read from the memory, and de-scrambling the scrambled data using the decoded scrambling seed. In an embodiment, encoding the scrambled data and the scrambling seed includes producing a single ECC code word that encodes both the scrambled data and the scrambling seed. In a disclosed embodiment, storing the encoded scrambled data and the encoded scrambling seed includes storing both the encoded scrambled data and the encoded scrambling seed in a single memory page.

There is also provided, in accordance with an embodiment of the present invention, apparatus for data storage, including:

an interface, which is configured to communicate with a memory device; and a processor, which is configured to define a set of scrambling sequences, each sequence including bits in respective bit positions having bit values, such that a distribution of the bit values in any give bit position satisfies a predefined statistical criterion, to scramble each data word using a respective scrambling sequence selected from the set, and to store the scrambled data words in the memory device.

There is further provided, in accordance with an embodiment of the present invention, apparatus for data storage, including:

an interface, which is configured to communicate with a memory device; and a processor, which is configured to hold at least a part of a scrambling sequence that was used in scrambling a given memory page that is stored in the memory device, to accept a request to access a specified portion of the given memory page in the memory device, and, in response to the request, to access the specified portion of the memory page by retrieving a corresponding portion of the scrambling sequence stored in the memory controller and applying the retrieved portion of the scrambling sequence to the portion of the memory page.

There is additionally provided, in accordance with an embodiment of the present invention, apparatus for data storage, including:

an interface, which is configured to communicate with a memory device; and a processor, which is configured to encode data for storage in the memory device using an Error Correction Code (ECC) so as to produce ECC-encoded data, to encode a scrambling sequence with the ECC so as to produce an ECC-encoded scrambling sequence, to calculate a bit-wise Exclusive Or (XOR) between the ECC-encoded data and the ECC-encoded scrambling sequence so as to produce a result, and to store the result in the memory device.

There is further provided, in accordance with an embodiment of the present invention, apparatus for data storage, including:

an interface, which is configured to communicate with a memory; and a processor, which is configured to scramble data for storage in the memory using a scrambling seed, to encode both the scrambled data and the scrambling seed using an Error Correction Code (ECC), and to store the encoded scrambled data and the encoded scrambling seed in a memory.

The present invention will be more fully understood from the following detailed description of the embodiments thereof, taken together with the drawings in which:

BRIEF DESCRIPTION OF THE DRAWINGS

FIGS. 3-8 are flow charts that schematically illustrate methods for data storage using data scrambling, in accordance with embodiments of the present invention.

DETAILED DESCRIPTION OF EMBODIMENTS

Overview

Figure 1:
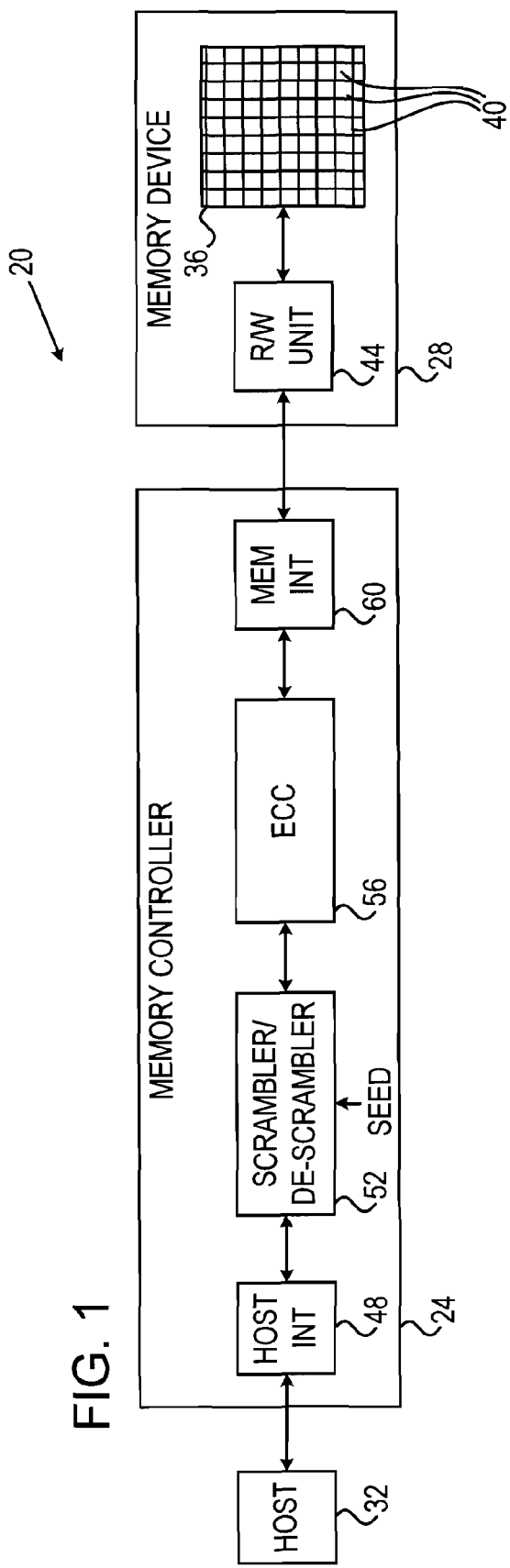
FIG. 1 is a block diagram that schematically illustrates a memory system, in accordance with an embodiment of the present invention.

Data storage systems sometimes scramble data before storing it in memory. Data scrambling (also referred to as data randomization) can be carried out, for example, by performing a bit-wise Exclusive Or (XOR) between the data and a pseudo-random scrambling sequence. Storage of scrambled data has a number of important advantages, such as elimination of severe and repetitive interference effects, and balancing of data-dependent cell wearing across the memory. Some signal processing schemes, such as adaptive estimation of read thresholds, perform better when operating on scrambled data. Although in some cases the data provided for storage already has random statistical properties (e.g., when storing compressed or encrypted data), in other cases the data may not be sufficiently randomized (e.g., in homogeneous areas of an uncompressed image, or when the data is padded with zeros).

Embodiments of the present invention that are described hereinbelow provide improved methods and systems for data scrambling and de-scrambling in storage applications. The embodiments described herein refer mainly to data scrambling in solid-state memory devices, such as Flash devices, but the disclosed techniques are equally applicable to a wide variety of other storage devices and applications.

Some of these methods relate to generation and manipulation of scrambling seeds, which are used for generating the pseudo-random scrambling sequences. In one disclosed technique, a memory controller encodes the scrambling seed with an Error Correction Code (ECC) together with the scrambled data, and stores the encoded data and seed in the memory. In another disclosed method, the memory controller generates the scrambling seed based on a global counter, which is modified (e.g., incremented) per each programming operation.

In some embodiments, the memory controller assesses the statistical distribution of bit values in the scrambled data, and estimates the level of randomness of the distribution. If the scrambled data is not sufficiently random, the memory controller modifies the scrambling configuration. Several techniques for assessing and improving data randomness are described. For example, the memory controller may operate multiple different scramblers in parallel and select the best-performing scrambler, and/or pad the scrambled data with dummy bits.

In some embodiments, the memory controller uses a balanced set of scrambling sequences. In a balanced set, any given bit position in the sequence has a substantially equal probability of being "0" and "1", when calculated over the entire set of sequences. The use of a balanced set of scrambling sequences distributes data-dependent wearing evenly among the memory cells, assuming that programming operations applied to a given cell group use different sequences selected from the set. Several techniques for generating and using balanced sets of scrambling sequences are described herein.

Other embodiments that are described herein provide alternative scrambler/de-scrambler configurations, which provide different trade-offs between storage latency and memory size requirements. Yet another disclosed method uses linearity properties of the ECC in order to perform scrambling concurrently with ECC encoding.

System Description

FIG. 1 is a block diagram that schematically illustrates a memory system 20, in accordance with an embodiment of the present invention. System 20 can be used in various host systems and devices, such as in computing devices, cellular phones or other communication terminals, removable memory modules ("disk-on-key" devices), Solid State Disks (SSD), digital cameras, music and other media players and/or any other system or device in which data is stored and retrieved.

System 20 comprises a memory controller 24, which stores data in a memory device 28 and retrieves data stored in the memory device. Memory controller 24 communicates with a host 32, for accepting data for storage in the memory device and for outputting data retrieved from the memory device.

Memory device 28 stores the data received from the memory controller in a memory cell array 36. The memory array comprises multiple analog memory cells 40. In the context of the present patent application and in the claims, the term "analog memory cell" is used to describe any memory cell that holds a continuous, analog value of a physical parameter, such as an electrical voltage or charge. Array 36 may comprise analog memory cells of any kind, such as, for example, NAND, NOR and Charge Trap Flash (CTF) Flash cells, phase change RAM (PRAM, also referred to as Phase Change Memory—PCM), Nitride Read Only Memory (NROM), Ferroelectric RAM (FRAM), magnetic RAM (MRAM) and/or Dynamic RAM (DRAM) cells.

The charge levels stored in the cells and/or the analog voltages or currents written into and read out of the cells are referred to herein collectively as analog values or storage values. Although the embodiments described herein mainly address threshold voltages, the methods and systems described herein may be used with any other suitable kind of storage values.

System 20 stores data in the analog memory cells by programming the cells to assume respective memory states, which are also referred to as programming levels. The programming levels are selected from a finite set of possible levels, and each level corresponds to a certain nominal storage value. For example, a 2 bit/cell MLC can be programmed to assume one of four possible programming levels by writing one of four possible nominal storage values into the cell.

Memory device 28 comprises a reading/writing (R/W) unit 44, which converts data for storage in the memory device to analog storage values and writes them into memory cells 40. In alternative embodiments, the R/W unit does not perform the conversion, but is provided with voltage samples, i.e., with the storage values for storage in the cells. When reading data out of array 36, R/W unit 44 converts the storage values of memory cells 40 into digital samples having a resolution of one or more bits. Data is typically written to and read from the memory cells in groups that are referred to as pages. In some embodiments, the R/W unit can erase a group of cells 40 by applying one or more negative erasure pulses to the cells.

Memory controller 24 comprises a host interface 48 for communicating with host 32. The data accepted from the host is scrambled, or randomized, using a scrambling/de-scrambling unit 52 before it is sent to memory device 28 for storage. Data scrambling is desirable, for example, in order to avoid severe interference scenarios and to balance the wear of memory cells 40. Data retrieved from memory device 28 is de-scrambled by unit 52 before it is provided to the host. The operation of unit 52, as well as several techniques for data scrambling and de-scrambling, are described in detail below.

In some embodiments, memory controller 24 comprises an Error Correction Code (ECC) unit 56, which encodes the data for storage using a suitable ECC and decodes the ECC of data retrieved from the memory. Any suitable type of ECC, such as, for example, Low Density Parity Check (LDPC), Reed-Solomon (RS) or Bose-Chaudhuri-Hocquenghem (BCH), can be used. Memory controller 24 communicates with memory device 28 using a memory interface 60.

Figure 2:
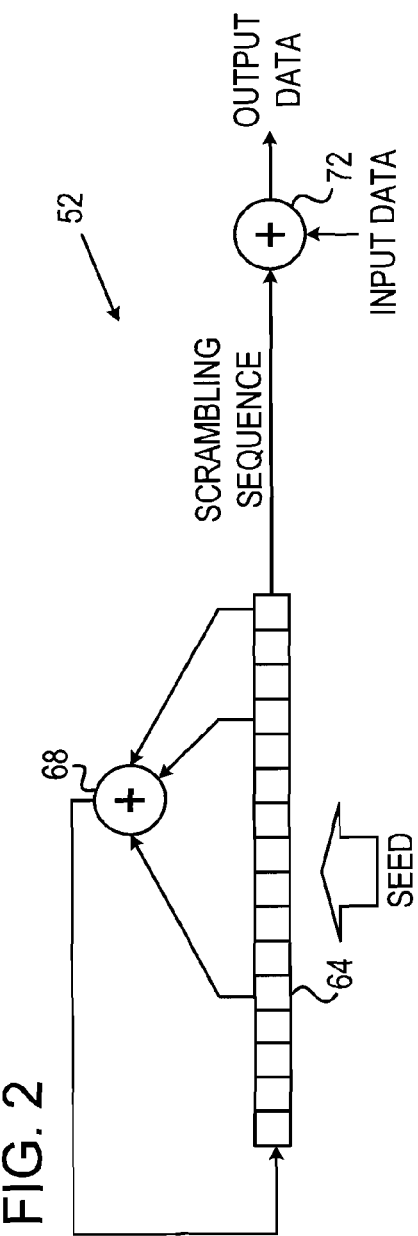
FIG. 2 is a block diagram that schematically illustrates a scrambler/de-scrambler used in a memory system, in accordance with an embodiment of the present invention.

Some or all of the elements of memory controller 24, and in particular scrambling/descrambling unit 52, may be implemented in hardware. An example implementation of unit 52 is shown in FIG. 2 below. Alternatively, the memory controller may comprise a microprocessor that runs suitable software, or a combination of hardware and software elements.

The configuration of FIG. 1 is an example system configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity. Although FIG. 1 shows a single memory device 28 for the sake of clarity, in alternative embodiments a single memory controller may control multiple memory devices 28.

In the exemplary system configuration shown in FIG. 1, memory controller 24 and memory device 28 are implemented as two separate Integrated Circuits (ICs). In alternative embodiments, however, the memory device and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which the memory array is disposed. Further alternatively, some or all of the functionality of memory controller 24 can be implemented in software and carried out by a processor or other element of the host system. In some embodiments, host 32 and memory controller 24 may be fabricated on the same die, or on separate dies in the same device package.

In some embodiments, memory controller 24 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

In an example configuration of array 36, memory cells 40 are arranged in multiple rows and columns, and each memory cell comprises a floating-gate transistor. The gates of the transistors in each row are connected by word lines, and the sources of the transistors in each column are connected by bit lines. The memory array is typically divided into multiple pages, i.e., groups of memory cells that are programmed and read simultaneously. Pages are sometimes sub-divided into sectors. In some embodiments, each page comprises an entire row of the array. In alternative embodiments, each row (word line) can be divided into two or more pages. For example, in some devices each row is divided into two pages, one comprising the odd-order cells and the other comprising the even-order cells. In a typical implementation, a two-bit-per-cell memory device may have four pages per row, a three-bit-per-cell memory device may have six pages per row, and a four-bit-per-cell memory device may have eight pages per row.

Erasing of cells is usually carried out in blocks that contain multiple pages. Typical memory devices may comprise several thousand erasure blocks. In a typical two-bit-per-cell MLC device, each erasure block is on the order of thirty-two word lines, each comprising several thousand cells. Each word line of such a device is often partitioned into four pages (odd/even order cells, least/most significant bit of the cells). Three-bit-per cell devices having thirty-two word lines per erasure block would have 192 pages per erasure block, and four-bit-per-cell devices would have 256 pages per block. Alternatively, other block sizes and configurations can also be used.

Some memory devices comprise two or more separate memory cell arrays, often referred to as planes. Since each plane has a certain "busy" period between successive write operations, data can be written alternately to the different planes in order to increase programming speed.

Example Scrambler/De-Scrambler Structure

FIG. 2 is a block diagram that schematically illustrates scrambling/de-scrambling unit 52, in accordance with an embodiment of the present invention. Unit 52 scrambles data by producing a pseudo-random scrambling sequence, and calculating a bit-wise Exclusive Or (XOR) between the scrambling sequence and the data. De-scrambling is performed in a similar manner, i.e., by calculating bit-wise XOR between the scrambled data and the scrambling sequence, to reproduce the original data.

In the present example, unit 52 produces the scrambling sequence using a Linear Feedback Shift Register (LFSR). Unit 52 comprises an N-bit shift register 64. The content of shift register 64 is shifted one bit to the right in each clock cycle. A XOR gate 68 computes a XOR of a predefined subset of the shift register bits, and the XOR result is fed-back to the shift register input. The output of shift register 64 is used as a scrambling sequence. Given an appropriate selection of feedback taps (i.e., selection of shift register bits to be XOR'ed and fed-back to the input), the scrambling sequence has pseudo-random properties.

A XOR gate 72 calculates bit-wise XOR between an input data sequence and the scrambling sequence, to produce an output data sequence. When unit 52 performs scrambling, the input data comprises data accepted from the host, and the output data comprises scrambled data to be sent to the memory device. When unit 52 performs de-scrambling, the input data comprises scrambled data read from the memory device, and the output data comprises de-scrambled data to be sent to the host.

When unit 52 initiates scrambling or de-scrambling certain data, the memory controller initializes shift register 64 to a certain N-bit initial value, referred to as a seed. The scrambling seed can be viewed as an initial offset along the scrambling sequence, from which the sequence generation begins. Therefore, setting an N-bit seed value can be viewed as selecting a scrambling sequence from a set of $2^N$ possible scrambling sequences. Several methods for generating and manipulating scrambling seeds and sequences are described below.

Typically although not necessarily, a given scrambling sequence originating from a given seed is used for scrambling (or de-scrambling) a memory page. For example, a page having 34,368 bits can be scrambles by bit-wise XOR with a 34,368-bit scrambling sequence. In some embodiments, unit 52 supports a set of $K<2^N$ possible seed values. Each seed value causes unit 52 to generate a respective pseudo-random scrambling sequence, which typically has small cross-correlation with the scrambling sequences of the other seed values.

In an example embodiment, N=16 and K=127. Alternatively, any other suitable values can also be used.

The configuration of FIG. 2 is an example configuration, which is shown purely for the sake of conceptual clarity. In alternative embodiments, any other scrambler/de-scrambler configuration can also be used. For example, various other LFSR configurations are known in the art, and any such configuration can be used for generating scrambling sequences in unit 52. Further alternatively, the scrambling sequence can be generated in advance and stored in a memory, instead of generating it during scrambling or de-scrambling. Several alternative scrambler/de-scrambler schemes are described further below.

In the embodiments described herein, scrambling and de-scrambling are performed per memory page. In other words, unit 52 in memory controller 24 scrambles the data of a given memory page using a certain seed, and stores the scrambled data in a certain memory page of device 28. When retrieving the memory page in question, unit 52 de-scrambles the data read from this memory page using the appropriate seed. Alternatively, however, scrambling and de-scrambling can be applied to any other suitable unit of data, such as to erasure blocks or sectors.

Encoded Storage of Scrambling Seed

In order to de-scramble the data properly, de-scrambling should begin with the same seed used for scrambling the data. In some embodiments, memory controller 24 stores the seed together with the scrambled data in memory device 28. When the data is encoded with ECC prior to storage, the memory controller applies ECC encoding to the seed, as well. When requested to retrieve the data, the memory controller reads the scrambled data and the seed from the memory device, decodes the ECC that encodes both data and seed, and then de-scrambles the retrieved data using the retrieved seed. Using this scheme, de-scrambling is performed using the same seed used for scrambling. Since the seed is also encoded with ECC, it is provided the same level of reliability and error-resilience as the data.

Figure 3:
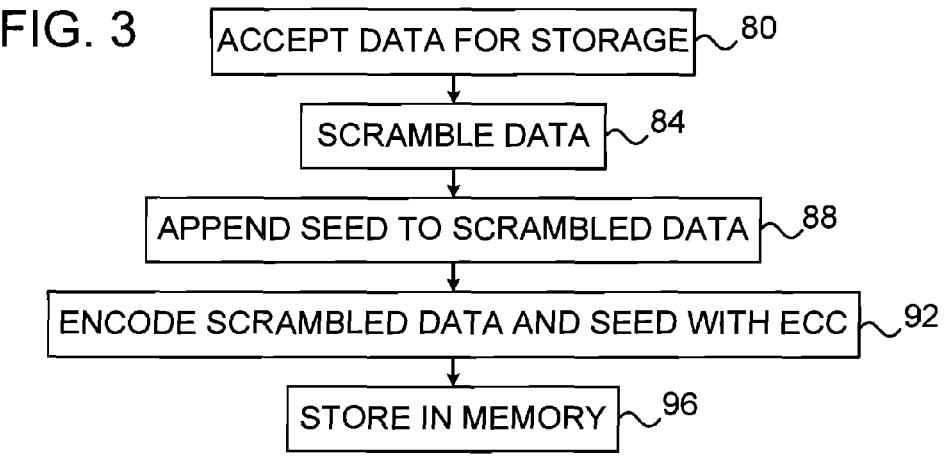

FIG. 3 is a flow chart that schematically illustrates a method for data storage, in accordance with an embodiment of the present invention. The method begins with memory controller 24 accepting data for storage from host 32, at an input step 80. Unit 52 scrambles the data (e.g., a memory page), at a scrambling step 84. Scrambling begins with a certain seed, as explained above. The memory controller appends the seed to the scrambled data, at an appending step 88. ECC unit 56 encodes both the scrambled data and the seed with ECC, at an encoding step 92. Typically, the ECC unit encodes both the scrambled data of the page and the seed in a single ECC code word. Memory controller 24 then stores the encoded scrambled data and seed in a given memory page in memory device 28, at a storage step 96.

When retrieving the data, the memory controller performs the operations of FIG. 3 in reverse order. The memory controller reads the given page from memory device 28, applies ECC decoding to the page (which comprises both scrambled data and seed), separates the seed from the scrambled data, and de-scrambles the data using the retrieved seed. The de-scrambled data is provided to the host.

Note that in the scheme of FIG. 3 the seed and the data are both encoded in the same ECC code word. If this code word is decoded successfully, both the seed and the data are free of errors. If, on the other hand, ECC decoding of the code word fails, the seed may contain errors that may prevent correct de-scrambling and thus render the data useless. In the latter case, however, the data itself is likely to contain errors anyway, because the seed is considerably shorter than the data. Therefore, the scheme of FIG. 3 is particularly suitable for applications having little or no tolerance for errors (applications in which a single error in the data causes discarding of the entire page). For these kinds of applications, the scheme of FIG. 3 gives the seed the right amount of protection—without overprotection that wastes valuable storage area. It may be possible in principle to protect the seed separately, for example using a separate ECC or by storing it at higher reliability (e.g., using a smaller number of programming levels). These solutions, however, either over-protect the seed and waste storage area, or have a risk of missing cases where the data could be detected but the seed contained errors. Nevertheless, the method of FIG. 3 can be used with error-tolerant applications, as well.

In some embodiments, the memory controller uses a given scrambling seed per erasure block rather than per page. In an example embodiment, the memory controller changes the seed of a given block each time the block is erased. The memory controller may store the currently-used seed in memory device 28, either in the corresponding block or separately. When erasing a given block, the memory controller may read the currently-used seed, specify a different seed for subsequent programming in that block, and store the new seed. In these embodiments, scrambling can still be performed per-page, with a different seed for each page in the block. For example, the seed assigned to a particular page in the block can be derived from the block's seed through some predefined relation (e.g. a function of the block seed and the page address).

Seed Generation Using Global Counter

In many memory devices, it is desirable that different programming operations to a given physical location (e.g., physical memory page) will use different scrambling seeds. In particular, it is desirable that different programming operations to a given physical location will use the different possible seed values approximately evenly. Varying the scrambling seed in different programming operations to the same physical location balances the wear of the memory cells at this location. As a result, the variance of the cells' analog storage values (e.g., threshold voltages or charge levels) is reduced, and readout performance is improved.

In some embodiments, memory controller 24 derives the seed value from a global counter, which is incremented (modulo K, which is a prime number) per each programming operation carried out by the memory controller. This scheme causes, with high likelihood, different programming operations to the same physical page to be performed with different seed values. Note that the global counter is associated with the memory controller, and not necessarily with the memory device. Thus, when memory controller 24 controls multiple memory devices 28 (e.g., different devices and/or different dies or planes in the same device), the global counter is incremented per each programming operation applied to any of these devices. As a result, the likelihood of using different seeds in different programming operations is further increased.

Figure 4:
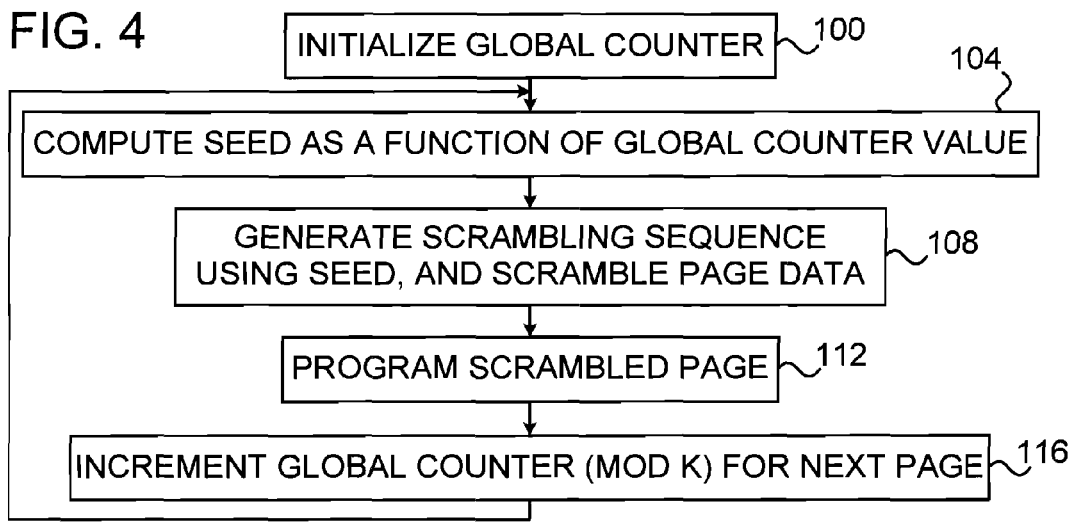

FIG. 4 is a flow chart that schematically illustrates a method for data scrambling and storage using a global counter, in accordance with an embodiment of the present invention. The method begins with memory controller 24 initializing the global counter, at an initialization step 100. The counter is typically initialized at power-up, and may be initialized to any desired value, such as to zero.

When preparing to program a page, the memory controller selects a scrambling seed for this page based on the global counter value, at a seed selection step 104. For example, the memory controller may select the seed value using the following operations:

seed_counter=(seed_counter+1)mod 127;

seed_index=(wordline_index*15+seed_counter)mod 128;

seed=seed_table[seed_index];

wherein seed_counter denotes the global counter, seed_table denotes a table holding 128 possible seed values, seed_index denotes the index of the selected seed, wordline_index denotes the index of the word line (an example of a physical location) in which the page is to be stored, and seed denotes the selected seed value extracted from seed_table.

Having selected a seed value for programming the next page, memory controller 24 scrambles the page using the selected seed value, at a page scrambling step 108. Typically, unit 52 in the memory controller generates a scrambling sequence using the selected seed value, and scrambles the page data using the scrambling sequence. The memory controller then stores the scrambled page at the desired location in memory device 28, at a programming step 112. Memory controller 24 increments the global counter (modulo K), at a counter incrementing step 116. The method then loops back to step 104 above, in which the memory controller selects a seed value for the next page to be programmed based on the new global counter value.

In the description above, the global counter is incremented per each programming operation performed by the memory controller. In alternative embodiments, however, the global counter can be decremented or otherwise modified in response to the respective programming operations performed by the memory controller.

Modifying the Scrambling Scheme Based on Randomization Performance

In some embodiments, after scrambling a given page, memory controller 24 assesses the statistical distribution of the bit values in the scrambled page, and estimates the level of randomness of the distribution. The memory controller verifies whether the randomness meets a certain expected level. If not, the memory controller modifies the scrambling configuration in order to increase the randomness in the page. In some embodiments, the scrambling configuration may be modified more than once, e.g., until reaching a satisfactory level of randomness.

Figure 5:
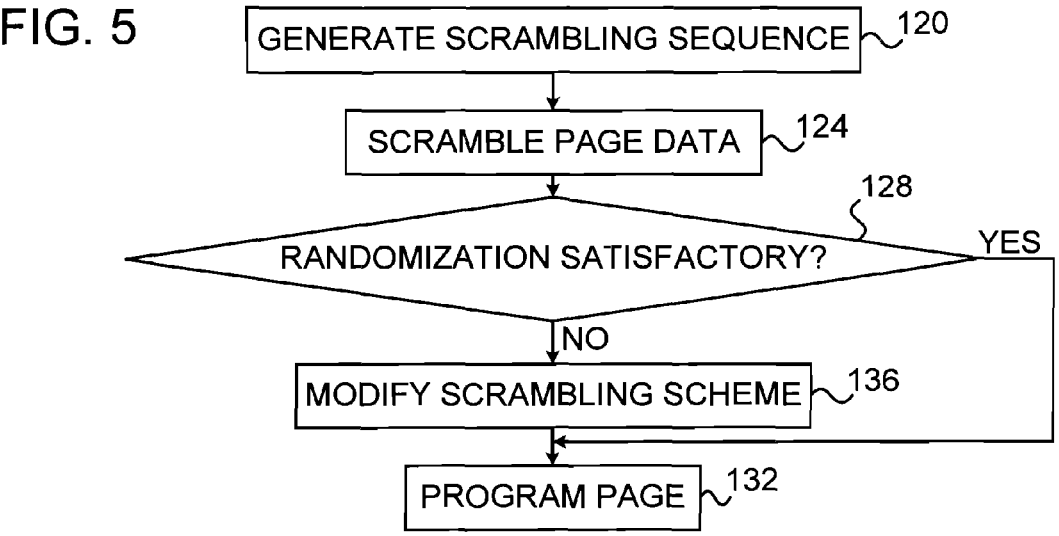

FIG. 5 is a flow chart that schematically illustrates a method for data storage that uses randomness verification, in accordance with an embodiment of the present invention. The method begins with unit 52 in memory controller 24 generating a certain scrambling sequence, at a sequence generation step 120. Unit 52 scrambles a memory page using this scrambling sequence, at a memory page scrambling step 124. The memory controller assesses the bit value distribution in the scrambled page, and checks whether the randomness of the distribution is sufficient, at a randomness assessment step 128. If sufficient, the memory controller programs the page in the memory device, at a page programming step 132. Otherwise, i.e., if the level of randomness in the scrambled page is considered insufficient, the memory controller modifies the scrambling configuration, at a scrambling modification step 136. The memory controller then programs the page at step 132, and the method terminates.

In some embodiments, memory controller 24 assesses the level of randomness (at step 128) by comparing the number of "0" and "1" bit values in the scrambled page. If the number of "0" bit values is similar to the number of "1" bit values, the page is regarded as scrambled with sufficient randomness, and vice versa. For example, the memory controller may set a threshold on the difference between the number of "0" and "1" bit values in the scrambled page. If the difference is smaller than the threshold the page is regarded as sufficiently random, and vice versa. Alternatively, the memory controller may use any other technique or logic for assessing the randomness in the scrambled page.

Upon detecting an insufficiently-random page, the memory controller may modify the scrambling scheme (at step 136) in various ways. For example, the memory controller may add one or more dummy bits to the scrambled data, in order to reduce the difference between the number of "0" and "1" bit values. In an example embodiment, a group of dummy bits (e.g., sixteen bits) is assigned for this purpose in each page. The memory controller can set these bits to any desired value, in order to eliminate (or at least reduce) the difference between the total number of "0" and "1" bit values in the page. (Note that dummy bits can be added to the data regardless of whether the level of randomness is considered sufficient or not. For example, the memory controller may add dummy bits in every page, unconditionally. Unconditional addition of dummy bits is especially suitable for implementations in which a portion of the page is assigned to dummy bits and is not used for other purposes.)

As another example, upon detecting an insufficiently-random page, the memory controller may select a different scrambling seed and re-scramble the page using the new seed. In some embodiments, the memory controller may change the seed until a certain satisfactory randomness level is reached. Alternatively, the memory controller may scramble the page multiple times using different candidate seed values, and select the seed value that provides the best randomness. In these embodiments, the memory controller may comprise multiple scrambling/de-scrambling units (e.g., unit 52 of FIG. 2), which operate in parallel using different seed values. The memory controller may use any desired number of candidate seeds. Typically, using a large set of candidate seeds increases complexity but may achieve better scrambling performance, and vice versa.

As yet another example, the memory controller may balance the number of "0" and "1" bit values in the page by dividing the page data into multiple sections, scrambling one or more sections using the scrambling sequence generated by the selected seed, and scrambling the remaining (one or more) sections using an inverse of this scrambling sequence. (In the present context, an inverse of a sequence is produced by flipping the bit values of the sequence, replacing "1" with "0" and vice versa.) Typically, if a given scrambling sequence causes a certain imbalance in the number of "0" and "1" bit values, the inverse of this sequence is likely to cause the opposite effect. Thus scrambling part of the page with a certain scrambling sequence, and another part with the inverse of this sequence, can improve the balance of "0" and "1" bit values. Typically, the memory controller stores information regarding the scrambling sequence polarity (i.e., whether scrambling was performed using the sequence or its inverse) in each section together with the scrambled data.

In some embodiments, the memory controller may decide whether to scramble each section with the sequence or its inverse in a progressive manner. In these embodiments, the memory controller typically scrambles the first section using the sequence, checks whether the data scrambled so far is balanced, and accordingly decides whether to use the sequence or its inverse in the next section.

When intending to scramble a given section, the memory controller typically attempts both possibilities (the sequence or its inverse) and selects the best-performing option. In other words, the memory controller scrambles the current section with the scrambling sequence, and then assesses the balance (randomness) of the data scrambled so far (including the previous sections and the current section). The memory controller then scrambles the current section using the inverse of the scrambling sequence, and again assesses the balance of the data scrambled so far, including the current section. The memory selects whether to scramble the current section using the sequence or its inverse based on the two assessments.

The progressive selection process described above is not limited to the use of a sequence and its inverse. For example, the memory controller may hold a set of section-size candidate scrambling sequences (or corresponding seeds). At each stage, the memory controller selects one of the candidate seeds for scrambling the next section. The selected seed is the one that, once applied to the current section, causes the entire data scrambled so far to have the highest level of randomness.

In some embodiments, the memory controller may combine two or more of the above-described balancing mechanisms. For example, the memory controller may run several scramblers in parallel and select the best-performing scrambling sequence. Then, if the selected sequence does not balance the "0" and "1" bit values completely, the memory controller can insert one or more dummy bits in order to eliminate the residual imbalance.

Additionally or alternatively, the memory controller may use any other suitable method for assessing the statistical distribution of bit values in the scrambled data, assessing the level of randomness of the distribution, and modifying the scrambling configuration if necessary. In some embodiments, the memory controller may modify the scrambling configuration more than once, using any of the techniques described above. For example, after performing scrambling modification step 136 of FIG. 5, the method may loop back to randomness assessment step 128 in order to check whether the modified scrambling configuration achieves a sufficient level of randomness. If not, the scrambling configuration can be modified again.

The above description refers mainly to Single-Level Cell (SLC) memory, in which each memory cell stores a single data bit. Many memory systems, however, use Multi-Level Cells (MLC), each storing $P \geq 2$ bits in multiple memory states. Typically, in a group of memory cells, different MLC bits are associated with different memory pages. For example, in an eight-level 3 bits/cell memory, the Least Significant Bits (LSB) of a given memory cell group store one page, the Center Significant Bits (CSB) store another page, and the Most Significant Bits (MSB) store a third page.

In MLC devices, the randomness requirement can be generalized to a requirement that the number of memory cells programmed to each memory state (i.e., to a specific combination of P bit values) be approximately the same after scrambling. Balancing the number of "0" and "1" bit values separately in each page, however, does not guarantee that the MLC memory states are balanced. In some embodiments, the memory controller checks whether the above-mentioned MLC balancing requirement holds for a given group of multi-level cells (e.g., a word line). If not, the memory controller modifies the scrambling configuration, so as to balance the number of memory cells corresponding to the different programming states.

In some embodiments, the memory controller selects the scrambling seeds for pages mapped to different MLC bits (e.g., for the LSB, CSB and MSB pages of a 3 bits/cell word line) from disjoint sets of candidate seeds. This feature helps to distribute the number of memory cells in the word line approximately evenly among the different memory states. This sort of selection avoids scenarios in which two or more pages in the same word line are scrambled with the same seed, a scenario that causes uneven distribution among memory states.

Scrambling Using a Balanced Set of Scrambling Sequences

As explained above with respect to FIG. 4, memory controller 24 typically changes the scrambling seed (and thus the scrambling sequence) that is used in different programming operations to a given physical memory location (e.g., physical memory page). However, even when this method is used, there is a risk that different memory cells will experience different wear levels.

Consider, for example, a memory system that uses a 7-bit seed, i.e., a set of 128 scrambling sequences. The length of each sequence is denoted L, which also denotes the number of data bits in each page. In order to ensure uniform wear of memory cells, it is desirable that the $i^{th}$ bit in the scrambling sequence will be "0" in 50% of the scrambling sequences and "1" in the other 50%. This condition should be met for all i, $i=1 \ldots L$. Otherwise, a memory cell that stores the $i^{th}$ bits of the different scrambling sequences, and another memory cell that stores the $j^{th}$ bits of the different scrambling sequences, may have different probabilities of assuming "0" or "1" values.

In order to meet the above-described condition, in some embodiments memory controller 24 uses a balanced set of L-bit scrambling sequences. The set is balanced by defining the scrambling sequences such that the distribution of the bit values in any given bit position satisfies a predefined statistical criterion. In a typical embodiment, the criterion specifies that for any $1 \leq i \leq L$, the $i^{th}$ bit in the sequence is "0" in half of the scrambling sequences, and is "1" in the other half. The balancing criterion can be somewhat relaxed by specifying that the $i^{th}$ bit in the sequence is "0" in a predefined portion of the scrambling sequences, which may deviate from 50%. For example, a set of scrambling sequences in which (for any i) the $i^{th}$ bit in the sequence is "0" in i 40%-60% of the sequences can also be regarded as a balanced set of sequences. Further alternatively, any other suitable statistical criterion can also be used.

In some embodiments, the memory controller produces a balanced set of scrambling sequences by adding another bit to the seed value. The additional bit (denoted "flip-bit") indicates to unit 52 whether scrambling is to be performed using the scrambling sequence or using its inverse. Thus, the flip-bit mechanism is equivalent to doubling the set of scrambling sequences, by adding the inverse of each scrambling sequence to the set. For example, adding an eighth flip-bit to the above-described 7-bit seed would double the set of scrambling sequences from 128 to 256. Since the $i^{th}$ bit in a given sequence is by-definition the opposite of the $i^{th}$ bit in the corresponding inverse sequence, the flip-bit mechanism causes the set of sequences to be balanced. In alternative embodiments, memory controller 24 may use any other suitable mechanism for generating a balanced set of scrambling sequences.

(The statistical properties of the scrambling sequences are especially important when the data provided for storage is not sufficiently randomized, e.g., in homogeneous areas of an uncompressed image, or when the data is padded with zeros. In these cases, the statistics of the scrambled data is determined by the statistics of the scrambling sequence. When the data provided for storage already has random statistical properties, e.g., when storing compressed or encrypted data, the statistics of the scrambled data will usually be random regardless of the statistics of the scrambling sequence.)

FIG. 6 is a flow chart that schematically illustrates a method for scrambling a memory page, in accordance with an embodiment of the present invention. The method begins with unit 52 in memory controller 24 accepting a scrambling seed that includes a flip-bit, at a seed input step 140. The seed comprises a total of N+1 bits, of which N bits are the seed from which the scrambling sequence is to be generated, and one bit is a flip-bit.

Unit 52 generates a scrambling sequence using the seed provided at step 140, at a sequence generation step 144. Unit 52 checks whether the flip-bit provided at step 140 equals "0" or "1", at a flip-bit checking step 148. If the flip-bit equals "0", unit 52 scrambles the page using the scrambling sequence generated at step 144 above, without reversing the sequence, at a scrambling step 152. Otherwise, i.e., if the flip-bit equals "1", unit 52 flips (i.e., negates or reverses) the bits of the scrambling sequence, at a sequence inversing step 156. Unit 52 then scrambles the page using the inverse scrambling sequence, at scrambling step 152. Typically, the value of the flip-bit is stored (usually as part of the seed) with the page data in memory device 28, in order to enable correct de-scrambling.

Note that in the description above a flip-bit value of "0" indicates that no inversing is to be performed, and "1" indicates that the inverse sequence is to be used. This choice, however, is made purely by way of example. In alternative embodiments, any other mechanism can be used to indicate to unit 52 whether to use the scrambling sequence or its inverse. The description above referred to scrambling of memory pages. Generally, however, any other type of L-bit data words can be scrambled using this method.

As explained with respect to FIG. 5 above, in an MLC device, the memory controller may select the scrambling seeds or sequences in a way that equalizes the numbers of memory cells programmed to different memory states. In some embodiments, the memory controller may use the flip-bit mechanism for this purpose. In an example embodiment, the memory controller may use the flip-bit mechanism for each page separately, as explained in FIG. 6. In addition, the memory controller can verify that, in the M pages stored in a given word line, the $2^M$ possible flip-bit value combinations are used approximately evenly. This condition causes even distribution of the memory cells among the different MLC memory states.

Storage of Previously-Generated Scrambling Sequences

In the configuration of FIG. 2 above, unit 52 comprises a LFSR, which generates a scrambling sequence serially when scrambling or de-scrambling a memory page. As can be appreciated, this sort of serial generation may introduce latency into the scrambling process. Moreover, some memory systems support random read and write operations, which enable programming and readout of only part of a page, which may be located at various positions within the page. When performing random read or write, the LFSR of FIG. 2 above would have to be cycled from the beginning of the scrambling sequence until reaching the position in the sequence that matches the part of the page being read or written. Only then the part of the page being read or written can be XOR'ed with the corresponding part of the scrambling sequence. This process adds considerable latency to random read and write operations.

In some embodiments, memory controller 24 stores a previously-generated copy of a scrambling sequence in memory, instead of generating the sequence serially during programming or readout. The sequence can be stored in a suitable on-chip memory of the memory controller, such as in a Look-Up Table (LUT). When performing a random access (read or write) of a partial part of a page, the memory controller can retrieve the corresponding part of the scrambling sequence from the LUT, and thus perform scrambling or de-scrambling using only the relevant part of the scrambling sequence without unnecessary delay. This technique can be applied to any desired number of scrambling sequences.

FIG. 7 is a flow chart that schematically illustrates a method for data scrambling or de-scrambling, in accordance with an embodiment of the present invention. The method begins with memory controller 24 storing a previously-generated scrambling sequence in a LUT, at a sequence storage step 160. The memory controller receives a request to access (read or write) a part of a page, at a random access request step 164. The part of the page to be read or written is located at a certain offset in the page.

In order to scramble or de-scramble the data of the part of the page being written or read, the memory controller accesses the LUT at the relevant offset, at a sequence access step 168. The memory controller retrieves the relevant part of the scrambling sequence (the part that corresponds to the part of the page being read or written), without a need to generate the sequence from the beginning. The memory controller then scrambles or de-scrambles the data using the retrieved part of the scrambling sequence.

The method of FIG. 7 may reduce latency, but comes at the expense of controller memory size. The memory size required in the controller is particularly large for large page sizes (and thus long scrambling sequences). In some embodiments, the memory controller applies a hybrid solution, which trades-off some memory size for latency. In some embodiments, the memory controller stores the LFSR state (i.e., the content of shift register 64) for multiple offsets along the scrambling sequence. For example, the memory controller may store the LFSR state for offsets 0, 100, 200, . . . or at any other desired granularity. When requested to scramble or de-scramble a part of a page at a given offset, the memory controller initializes shift register 64 to the nearest available offset that does not exceed the requested offset. Then, unit 52 runs the LFSR until reaching the desired offset.

For example, consider a scenario in which the memory controller stores the LFST state at offsets 0, 100, 200, 300 . . . in the scrambling sequence. If the memory controller is requested to perform random write starting at an offset of 214 bits in the page, the memory controller initializes shift register 64 with the state of offset 200, and then runs the shift register for 14 clock cycles. As can be appreciated, this technique trades-off memory size for latency. Storing the LFSR state at more offset values increases the required memory size, but enables reaching any desired offset at fewer clock cycles.

Concurrent Scrambling and ECC Encoding

As explained with respect to FIG. 5 above, in some embodiments memory controller 24 scrambles a given page using multiple alternative scrambling sequences in parallel, and then selects the scrambled page having the best data randomness. For example, the memory controller may select the scrambled page in which the numbers of "0" and "1" bit values are most balanced. When using this technique, however, ECC unit 56 can typically start ECC encoding only after the appropriate scrambling sequence has been selected. As a result, the latency of the storage process may increase considerably.

When the ECC used in system 20 is linear, the scrambling and ECC encoding tasks can be separated and parallelized. For a linear ECC, the scrambling and ECC encoding operation can be re-written as $$ECC(DATA\ XOR\ SCRAMBLING_{SEQ})=(ECC(DATA)\ XOR\ ECC(SCRAMBLING_{SEQ}))$$

wherein DATA denotes the page data, $SCRAMBLING_{SEQ}$ denotes a scrambling sequence, and ECC( ) denotes the ECC encoding operation.

In other words, instead of scrambling the data and then encoding the scrambled data, it is possible to encode the un-scrambled data, separately encode the scrambling sequence, and then calculate a bit-wise XOR between the encoded data and the encoded scrambling sequence. Memory controller 24 may use this equivalence to reduce the total latency of the scrambling and ECC encoding process.

In some embodiments, the memory controller encodes the different possible scrambling sequences with ECC, and stores the encoded scrambling sequences for future use. The terms $(ECC(SCRAMBLING_{SEQ}))$ are data-independent. When receiving a data page for storage, the memory controller encodes the page data with ECC (i.e., produces ECC(DATA)) irrespective of scrambling. At least partially in parallel, the memory controller scrambles the data with the different scrambling sequences and identifies the best-performing scrambling sequence. Then, the memory controller calculates the XOR between ECC(DATA) and the previously-stored $ECC(SCRAMBLING_{SEQ})$ of the selected scrambling sequence. Since ECC encoding of the data is performed in parallel to scrambling, the overall storage latency is reduced.

FIG. 8 is a flow chart that schematically illustrates a method for data storage, in accordance with an embodiment of the present invention. The method begins with memory controller 24 pre-computing and holding $ECC(SCRAMBLING_{SEQ})$ for the different possible scrambling sequences, at an ECC pre-computing step 170. At a later point in time, memory controller 24 receives a data page for storage, at an input step 174. The memory controller encodes the un-scrambled data page (i.e., calculates ECC(DATA)), while in parallel scrambling the data and searching for the best-performing scrambling sequence, at an encoding and scrambling step 178.

At the end of step 178, the memory controller has computed ECC(DATA) and has selected the scrambling sequence producing the best randomness. The memory controller calculates a XOR between ECC(DATA) and the pre-computed ECC of the selected scrambling sequence ($ECC(SCRAMBLING_{SEQ})$), at a XOR step 182. The result of step 182 is equivalent to $ECC(DATA\ XOR\ SCRAMBLING_{SEQ})$, i.e., the ECC of the data after scrambling with the optimum scrambling sequence. The memory controller stores this result in memory device 28, at a result storage step 186.

Although the embodiments described herein mainly address data scrambling for storage in non-volatile solid state memory devices, the methods and systems described herein can also be used for storage in other types of memory devices, such as Hard Disk Drives (HDD).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for data storage, comprising:
    defining a set of scrambling sequences, each sequence comprising bits in respective bit positions having bit values, such that a distribution of the bit values in any give bit position satisfies a predefined statistical criterion;
    scrambling each data word using a respective scrambling sequence selected from the set; and
    storing the scrambled data words in the memory device,
    wherein defining the set comprises specifying the set to include a group of the scrambling sequences, and respective inverses of the scrambling sequences in the group.

2. The method according to claim 1, wherein the statistical criterion specifies that half of the bit values in any given bit position are "0" and the other half of the bit values are "1".

3. The method according to claim 1, wherein specifying the set comprises:
    defining a scrambling seed comprising multiple bits, each combination of values of the bits defining a respective scrambling sequence;
    adding to the scrambling seed an additional bit, which selects between the respective scrambling sequence and an inverse of the respective scrambling sequence; and
    generating the scrambling sequences in the set using the scrambling seed, including the additional bit.

4. A method for data storage, comprising:
    encoding data for storage in a memory device using an Error Correction Code (ECC) so as to produce ECC-encoded data;
    encoding a scrambling sequence with the ECC so as to produce an ECC-encoded scrambling sequence;
    calculating a bit-wise Exclusive Or (XOR) between the ECC-encoded data and the ECC-encoded scrambling sequence so as to produce a result; and
    storing the result in the memory device.

5. The method according to claim 4, wherein encoding the scrambling sequence comprises:
    scrambling the data using two or more candidate scrambling sequences, so as to produce respective scrambled data sequences;
    selecting one of the scrambling sequences based on a condition defined over the scrambled data sequences; and
    encoding the selected scrambling sequence to produce the ECC-encoded scrambling sequence.

6. The method according to claim 5, wherein scrambling the data and selecting the scrambling sequence are performed at least partly in parallel to encoding the data with the ECC.

7. Apparatus for data storage, comprising:
    an interface, which is configured to communicate with a memory device; and
    a processor, which is configured to define a set of scrambling sequences, each sequence comprising bits in respective bit positions having bit values, such that a distribution of the bit values in any give bit position satisfies a predefined statistical criterion, to scramble each data word using a respective scrambling sequence selected from the set, and to store the scrambled data words in the memory device, wherein the processor is configured to specify the set to include a group of the scrambling sequences, and respective inverses of the scrambling sequences in the group.

8. The apparatus according to claim 7, wherein the statistical criterion specifies that half of the bit values in any given bit position are "0" and the other half of the bit values are "1".

9. The apparatus according to claim 7, wherein the processor is configured to specify the set by:

defining a scrambling seed comprising multiple bits, each combination of values of the bits defining a respective scrambling sequence;

adding to the scrambling seed an additional bit, which selects between the respective scrambling sequence and an inverse of the respective scrambling sequence; and generating the scrambling sequences in the set using the scrambling seed, including the additional bit.

10. Apparatus for data storage, comprising:

an interface, which is configured to communicate with a memory device; and a processor, which is configured to encode data for storage in the memory device using an Error Correction Code (ECC) so as to produce ECC-encoded data, to encode a scrambling sequence with the ECC so as to produce an ECC-encoded scrambling sequence, to calculate a bit-wise Exclusive Or (XOR) between the ECC-encoded data and the ECC-encoded scrambling sequence so as to produce a result, and to store the result in the memory device.

11. The apparatus according to claim 10, wherein the processor is configured to scramble the data using two or more candidate scrambling sequences so as to produce respective scrambled data sequences, to select one of the scrambling sequences based on a condition defined over the scrambled data sequences, and to encode the selected scrambling sequence so as to produce the ECC-encoded scrambling sequence.

12. The apparatus according to claim 11, wherein the processor is configured to scramble the data and select the scrambling sequence at least partly in parallel to encoding the data with the ECC.

* * * * *